(12) United States Patent
Shinjo et al.

(10) Patent No.: US 8,386,526 B2
(45) Date of Patent: Feb. 26, 2013

(54) COUPLED NODE TREE BACKUP/RESTORE APPARATUS, BACKUP/RESTORE METHOD, AND PROGRAM

(75) Inventors: Toshio Shinjo, Chiba (JP); Mitsuhiro Kokubun, Chiba (JP)

(73) Assignee: Kousokuya, Inc., Kanagawa (JP)

( * ) Notice: Subject to any disclaimer, the term of this patent is extended or adjusted under 35 U.S.C. 154(b) by 90 days.

(21) Appl. No.: 12/588,531

(22) Filed: Oct. 19, 2009

(65) Prior Publication Data

US 2010/0042598 A1 Feb. 18, 2010

Related U.S. Application Data

(63) Continuation of application No. PCT/JP2008/000983, filed on Apr. 14, 2008.

(30) Foreign Application Priority Data

Apr. 19, 2007 (JP) ................... 2007-110019

(51) Int. Cl.
*G06F 17/30* (2006.01)
(52) U.S. Cl. ........................ 707/797; 707/706
(58) Field of Classification Search ........................ None
See application file for complete search history.

(56) References Cited

U.S. PATENT DOCUMENTS 6,675,163 B1 * 1/2004 Bass et al. .............................. 1/1

FOREIGN PATENT DOCUMENTS

| EP | 2 048 584 A1 | 4/2009 |
|---|---|---|
| JP | 2001-357070 A | 12/2001 |
| JP | 2008-015872 A | 1/2008 |
| JP | 2008-112240 A | 5/2008 |
| WO | WO-2008/004335 A1 | 1/2008 |

OTHER PUBLICATIONS

Daichi Goto, "Sawatte Manabu Data Kozo, Tsukatte Mini Tsuku Algorithm Kochira Java API Kenkyusho!" Java Press, vol. 34, pp. 202-210 (Feb. 15, 2004).
R. Sedgewich, Algorithm, vol. 1, 1st edition, Kindai Kagaku Sha Co., Ltd. pp. 49-54 (Oct. 10, 1990).
"*Patorishia Tsuri (Patricia Tree)*", vol. 11, No. 2, pp. 337-339, Journal of Japanese Society for Artificial Intelligence (Mar. 1, 1996).
Jung, M. et al., "A Dynamic Construction Algorithm for the Compact Patricia Trie using the Hierarchical Structure", Information Processing & Management, Elsevier, Barking, GB LNKD-DOI: 10.1016/S0306-4573(01)00031-0, vol. 38, No. 2, Mar. 1, 2002, pp. 221-236, XP004323332 ISSN: 0306-4573.

(Continued)

*Primary Examiner* — Syed Hasan
(74) *Attorney, Agent, or Firm* — Rader, Fishman & Grauer PLLC

(57) ABSTRACT

A coupled node tree has a root node and a node pair, the node pair being a branch node, which includes position information of a link target node pair, and a leaf node, which includes a search target index key, or a pair of branch nodes, or a pair of leaf nodes located in adjacent storage areas. The nodes of the coupled node tree are backed up in a depth precedence search sequence. The coupled node tree is restored by repeating the following process: reading out the nodes in the sequence they are backed up, storing in a stack the position information of the node to be restored, successively restoring child nodes as long as branch nodes are encountered, restoring a leaf node which is read out and then, tracing back up the stack, a decision being made as to which node is next to be restored.

19 Claims, 20 Drawing Sheets

OTHER PUBLICATIONS

Li, X., et al., "Stateful Inspection Firewall Session Table Processing", School of Computer Science and Technology, Harbin Institute of Technology, International Journal of Information Technology, vol. 11, No. 2, 2005, pp. 21-30.

Communication from European Patent Office for application No. 08738589.4-2201 dated Nov. 5, 2010.

International Search Report for PCT/JP2008/000983, dated Jul. 15, 2008.

Shigeaki Yazaki, "Zu De Wakaru! Programming No. 10 Dai Kisochishiki Data Kozo," Nikkei Software, vol. 6, No. 2, pp. 44-45 (Jan. 24, 2003).

Office Action dated Dec. 24, 2009 in Japanese application No. 2007-114915.

Communication from European Patent Office for application No. 08 738 589.4-2201 dated Aug. 9, 2011.

Nilsson et al., "IP-Address Lookup Using LC-Tries", IEEE Journal on Selected Areas in Communications, vol. 17, No. 6, Jun. 1999, pp. 1083-1092.

Sedgewick et al., "ALGORITHMEN, Kapitel 17: Digitales Suchen," Algorithmen, Addison-Wesley, Munchen [U.A.], XP002655476, pp. 289-303, Jan. 2002.

Aho et al., "Data Structures and Algorithms—Chapter 3: Trees," Addison Wesley, USA, Canada, pp. 75-106, Apr. 1987.

Brooks, "Serializing Trees, General Trees," CS 245, Data Structures and Algotithms, Department of Computer Science, University of San Francisco, http://www.cs.usfca.edu/-brooks/S04classes/cs245/lectures/lecture11.pdf, Mar. 2004.

Summons to attend oral proceedings in corresponding European application No. 08738589.4, issued on Mar. 22, 2012.

* cited by examiner

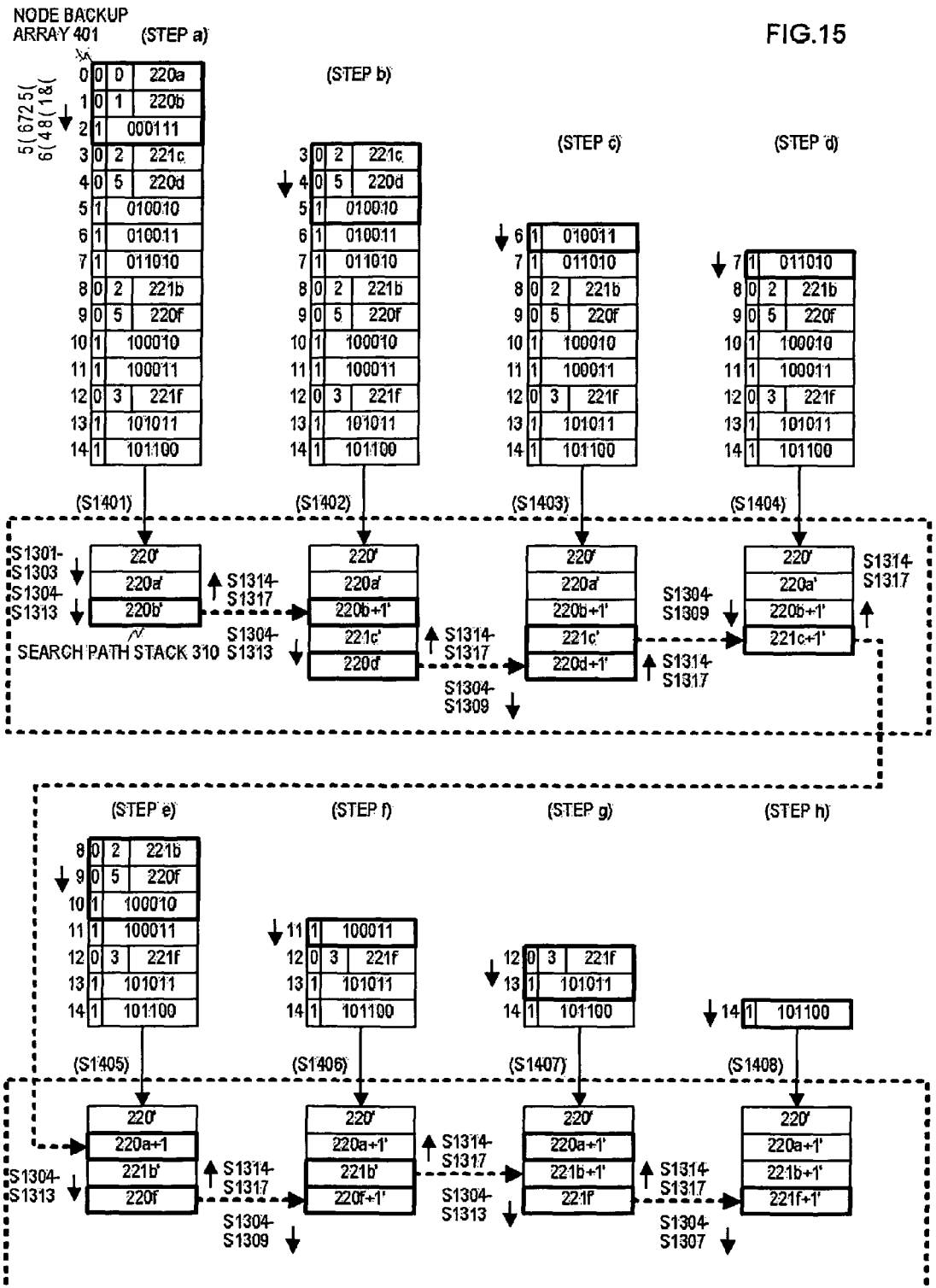

US 8,386,526 B2

COUPLED NODE TREE BACKUP/RESTORE APPARATUS, BACKUP/RESTORE METHOD, AND PROGRAM

CROSS-REFERENCE TO RELATED APPLICATION

This application is a continuation of PCT/JP2008/000983 filed on Apr. 14, 2008, and is based and claims the benefit of priority Japanese Patent Application No. 2007-110019, filed on Apr. 19, 2007, the entire contents of which are incorporated herein by reference. The contents of PCT/JP2008/00 0983 are incorporated herein by reference in their entity.

BACKGROUND OF THE INVENTION

1. Field of the Invention

The present invention relates to a search technology that searches for a desired bit string from a set of bit strings using a data structure of bit strings stored in a tree and especially relates to backup/restore the coupled node tree proposed by this applicant in Japanese patent application 2006-187827.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database.

In order to perform the above-noted searching for bit strings at high speed, conventional art makes various refinements on the data structure in which bit strings are stored. One of these is a tree structure known as a Patricia tree.

FIG. 1 shows an example of a Patricia tree used for searching processing in the above-noted conventional art. A node of a Patricia tree is formed to include an index key, a test bit position for a search key, and right and left link pointers. Although it is not explicitly shown, a node of course includes information for the purpose of accessing a record corresponding to the index key.

In the example shown in FIG. 1, the node 1750a that holds the index key "100010" is a root node, the test bit position 1730a of which is 0. The node 1750b is connected to the left link 1740a of the node 1750a, and the node 1750f is connected to the right link 1741a of the node 1750a.

The index key held by the node 1750b is "010011," and the test bit position 1730b is 1. The node 1750c is connected to the left link 1740b of the node 1750b, and the node 1750d is connected to the right link 1741b of the node 1750b. The index key held by the node 1750c is "000111," and the test bit position is 3. The index key held by the node 1750d is "011010," and the test bit position is 2.

The parts connected to the node 1750c by a solid lines show the right and left link pointers of the node 1750c, and the left pointer 1740c that is not connected by the dotted line indicates that that field is blank. The dotted line connection destination of the right pointer 1741c that is connected by a dotted line expresses the address indicated by the pointer, and in this case this indicates that the right pointer points to the node 1750c.

The right pointer 1741d of the node 1750d points to the node 1750d itself, and the node 1750e is connected to the left link 1740d. The index key held by 1750e is "010010," and the test bit position is 5. The left pointer 1740e of the node 1750e points to the node 1750b, and the right pointer 1741e of the node 1750e points to the node 1750e.

The index key held by the node 1750f is "101011," and the test bit position 1730f is 2. The node 1750g is connected to the left link 1740f of the node 1750f and the node 1750h is connected to the right link 1741f of the node 1750f.

The index key held by the node 1750g is "100011," and the test bit position 1730g is 5. The left pointer 1740g of the node 1750g points to the node 1750a, and the right pointer 1741g of the node 1750g points to the node 1750g.

The index key held by the node 1750h is "101100," and the test bit position 1730h is 3. The left pointer 1740h of the node 1750h points to the node 1750f, and the right pointer 1741h of the node 1750h points to the node 1750h.

In the example of FIG. 1, the configuration is such that, as the tree is traversed downward from the root node 1750a the test bit position of successive nodes increases.

When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0.

Unless the test bit position of a link target node is larger than the bit position of the link origin node, that is, if the link target is not below but rather returns upward (the returning links shown by the dotted lines in FIG. 1 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

In order to resolve these disadvantages of the Patricia tree, there is, for example, the technology disclosed in Patent Reference 1 below. In the Patricia tree described in Patent Reference 1 below, by storing lower level sibling nodes in a contiguous area, the space need for pointers is reduced as well as by setting a bit in each node to show whether or not the next link is a back link the determination processing for back links is reduced.

However, even in the disclosure of Patent Reference 1 below, since each node always reserves an area for the index key and the area for a pointer, and a single pointer is used for storing lower level sibling nodes in a contiguous area as shown for example even in the parts of left pointer 1740c, right pointer 1741h, etc. that are the lowest level parts of the Patricia tree shown in FIG. 1, the same amount of space must be allocated, etc., and there is not a very big space reduction effect.

Also the problem of the delay in the search processing caused by a back links, and the difficulty of processing such as adding and deleting, etc., is not improved.

Patent Document 1: Japanese Published Patent Application 2001-357070

SUMMARY OF THE INVENTION

In order to resolve the problems in the above-noted conventional art, in the patent application 2006-187827 the applicant proposed a bit string search (method) using a coupled node tree, which tree is a tree structure for bit string searches formed by a root node and a node pair stored in adjacent areas that is formed by a branch node and a leaf node, branch nodes, or leaf nodes; the root node showing the start point of the tree and being a leaf node if there is only one node in the tree and being a branch node if there are two or more nodes in the tree; the branch node including a discrimination bit position in the search key and information indicating a position of one node of a node pair of a link target; and the leaf node containing index keys that are the target bit strings of a bit string search.

The above cited patent application shows a method for creating a coupled node tree from a set of received index keys and basic search methods using a coupled node tree, such as methods for searching for a single index key from that coupled node tree, etc.

It also explains that the coupled node tree configuration is uniquely stipulated by the set of index keys.

Also the bit string searches may also include various kinds of search requests, such as requests to find a minimum value or maximum value or searches for a value within a given range, etc. Regarding this point, this inventor proposed methods, etc., of obtaining maximum/minimum values of index keys included in any arbitrary subtree of a coupled node tree in patent application 2006-293619.

The method of obtaining the maximum/minimum value of the index keys is to link only to the primary node or the node that is paired with the primary node (hereinafter called the non-primary node) until a leaf node is reached, and the method of obtaining in ascending or descending order the index keys stored in the coupled node tree is, as will be explained later, to repeat the minimum value search or maximum value search and, by using the fact that the index keys in the coupled node tree are disposed with sequentiality, changing the search start node based on that sequentiality.

Also each of the above cited patent applications disclosed that the coupled node tree is disposed in an array and that, in each of the search processing proposed above, the array element number of the nodes on the search path over the tree from the search start node are successively stacked in a search path stack, and the processing uses the array element numbers stacked in the search path stack.

As was explained above, regarding the disposition in a storage area of the coupled node tree proposed in each of the above patent applications specifies that both of the nodes that make up a node pair are located in adjacent storage areas but there is no restriction on the disposition arrangement between node pairs and that is left up to the application or the memory management system that manages the storage area.

Also the position information that shows the position of the primary node, which is one node of the node pair that is the link target of a branch node, is, of course, prescribed by the storage area which stores the coupled node tree.

Thus, when a coupled node tree is to be copied to another storage area and used there, even if the relative relationship for the disposition arrangement in the memory area between node pairs were to be copied just as they were stored, the value of the position information related to the link targets included in branch nodes must be changed.

Also the situation of the target of the copy may be such that the relative relationship for the disposition arrangement in the memory area between node pairs cannot be copied just as they were stored, and not only the appropriateness but also the necessity of copying the disposition arrangement just as stored is generally rejected.

Since the above description holds true, some kind of conversion processing becomes necessary if, for example, certain kinds of computer processing is to be done, such as moving a coupled node tree from main memory to an external storage device or sending it to a storage device of another computer via telecommunication lines.

Thus, in order to make that conversion processing simple, it is conceivable to define an exchange format for the node information of the coupled node tree and to do copy processing using that exchange format, not depending on the disposition of the coupled node tree in a storage area.

For example, it is clear that copy processing is completed if the index keys stored in a coupled node tree are themselves transferred to the target side and the coupled node tree is generated on the target side based on the index keys transferred. However, that would be called the transfer of index keys rather than the transfer of a coupled node tree and processing once again becomes necessary for the target of the transfer to decide the discrimination bit position that should be included in the branch node based on a comparison between index keys and to generate a coupled node tree including the processing necessary to decide the place where the new nodes should be inserted. Thus it is preferable to invent a method that enables efficient conversion processing without requiring processing such a decisions on the discrimination bit position or the place of node insertion.

Thus the purpose of this invention is to propose an efficient backup method and restore method which does not depend on the actual disposition of a coupled node tree in a storage area and which consists of a backup method, which converts the coupled node tree into the conversion format for the node information of the coupled node tree and stores it in some storage area, and a restore method corresponding to the backup method, which transforms that exchange format back into a coupled node tree.

According to the backup method in a preferred embodiment of this invention, the tree configuration of the coupled node tree is converted and backed up to an array of node information.

In other words, the contents of the nodes of the coupled node tree are written successively into a storage area used for backup.

This storage area could be an array.

In the above mentioned processing, the previously proposed method of extracting in ascending or descending order the index keys stored in the coupled node tree is applied, and the contents of the nodes traversed when repeating a minimum value search or a maximum value search, that is to say, the nodes on the link path from the search start node to the minimum value or maximum value, and the contents of the search start node starting the next minimum value search or maximum value search, are written into the storage area used for backup, in the sequence those nodes were traversed.

According to the backup method cited above, the sequential traversal of the nodes of the coupled node tree means traversing nodes or traversing a path and a search start node means the traverse start node.

A detailed algorithm for the backup method of this invention is as follows.

Just as the method of extracting index keys in ascending or descending order can be applied to any arbitrary subtree of a coupled node tree, so backup can also be applied to any arbitrary subtree, and thus first of all, the root node of the subtree that is to be backed up is specified and the traverse start node.

Next, traversing from the traverse start node and linking to only the primary nodes or to only the non-primary nodes up to a leaf node, for each node on that path from the traverse start node to the leaf node, position information indicating the position of those nodes are successively stored in a stack while the contents of those nodes are successively backed up to a separate storage area.

Next, pop operations are repeated on the stack until position information of a primary node (when linking only to non-primary nodes) or non-primary node (when linking only to primary nodes) is obtained and the position information is read out from the stack and the non-primary node or primary node paired with, respectively, the primary node or non-primary node for the read-out position information is specified as the traverse start node, and backup is repeated by a traverse made from that node.

By the above processing, each node of the coupled node tree is stored in the backup storage area in the sequence of the nodes traversed.

At that time, since, when the coupled node tree is restored, it is usually restored in an area other than the storage area before the backup, the original position information of the primary node in the branch node loses its meaning, and it is sufficient to backup only the node type and discrimination bit position of the branch node.

In accordance with one embodiment of the restore method related to a preferred embodiment of this invention, a restore method is provided for restore a coupled node tree from the node information (backup information) stored in the storage area for the backup.

This restore does not depend on the disposition of the coupled node tree in a storage area and is a reconversion, back into the data configuration of a coupled node tree, of a data configuration wherein a vector of node information has been converted to a conversion format for the node information of the coupled node tree.

In this restore method, the nodes are sequentially read out from the backup information and the nodes are restored in the sequence wherein they were read out.

When the root node of the coupled node tree to be restored is ready to be restored, a storage area is acquired for the root node and the root node is restored by storing the contents of the node read out into that storage area.

Also the restore method repeats the process wherein, while the nodes read out are branch nodes the child node of that branch node next in sequence in the backup information is backed up by acquiring as storage area for that node as well as a storage are for the node that is a pair with that node and storing the contents read out for that child node into that storage area, and, if a leaf node is read out, a storage area that was allocated but not restored is searched for, by tracing back up the tree structure toward the root node, and a decision is made that the storage area found thereby is to be the storage area wherein to store the contents of the node that should next be restored.

Also, in accordance with another embodiment of this invention, a transfer medium can be used instead of the storage medium configuring the above storage area for backup, and the sending party traverses the coupled node tree and sequentially extracts the nodes and transmits the extracted nodes via a transfer medium and the receiving party restores coupled node tree in the storage area of the receiving party using the received nodes as nodes to be restored.

The coupled node tree backup method in accordance with a preferred embodiment of this invention is a method to backup the nodes configuring a subtree of the coupled node tree that is the object of the backup in a depth-prioritized search sequence.

As a result, the nodes are backed up in a sequence (depth-prioritized search sequence) which does not depend on how the original coupled node tree was actually disposed in the storage area.

The reuse of coupled node trees is facilitated with the help of this kind of backup/restore processing.

Also, the backup method and restore method above are simple methods that do not include complex processing such as decisions based on the discrimination bit position or index key values included in the nodes.

In other words, in accordance with a preferred embodiment of this invention, the coupled node tree backup/restore processing can be implemented efficiently and in a simple process by using the special features of the configuration of a coupled node tree.

BRIEF DESCRIPTION OF THE DRAWINGS

FIG. 15 is a drawing showing the status of the search path stack and the backup node array changed by the restore processing

DESCRIPTION OF THE PREFERRED EMBODIMENTS

First the coupled node tree premised in this invention and proposed by this inventor previously in the above cited application is described using an example of storing a coupled node tree in an array. Although it is possible to use address information in a storage device as the data indicating the position of a link target held by a branch node, by using an array formed by array elements that can store the larger of the occupied storage capacity area between a branch node and a leaf node, it is possible to express the node position as an array element number, enabling a reduction of the amount of position information.

Figure 2A:
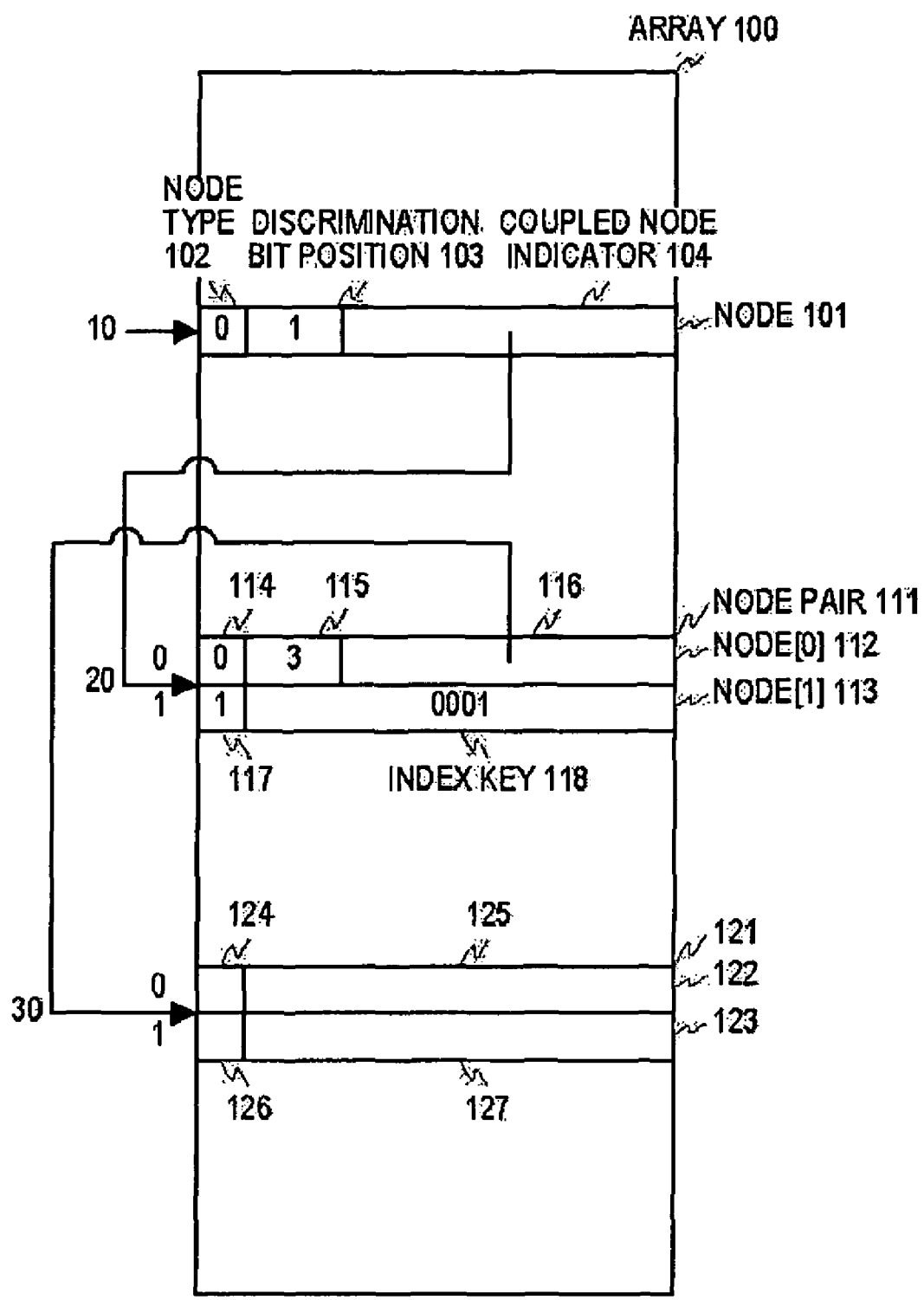
FIG. 2A is a drawing describing an exemplary configuration of a coupled node tree stored in an array.

FIG. 2A is a drawing that describes an exemplary configuration of a coupled node tree that is stored in an array.

Referring to FIG. 2A, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0] 112, which is the primary node of the node pair 111. The non-primary node [1] 113 forming a pair with the primary node is stored into the next, adjacent, array element (array element number 20+1). The value 0 is stored in the node type 114 of the node [0] 112, the value 3 is stored in the discrimination bit position 115, and the value 30 is stored in the coupled node indicator 116. The value 1 is stored in the node type 117 of the node [1] 113, thereby indicating that the node [1] 113 is a leaf node. The value "0001" is stored in the index key 118. In the same manner as in a Patricia tree described above, although information for accessing a record corresponding to an index key is of course included in a leaf node, this is omitted from the notation.

Primary nodes are indicated as the node [0], and non-primary nodes that are paired therewith are indicated as the node [1]. Also the node stored in an array element with some array element number is called the node of that array element number and the array element number stored in the array element of that node is also called the array element number of the node.

The contents of the node pair 121 formed by the node 122 and the node 123 that are stored in the array elements having array element numbers 30 and 31 are not shown.

The 0 or 1 that is appended to the node [0] 112, the node [1] 113, the node 122, and the node 123 indicates respectively to which node of the node pair linking is to be done when performing a search using a search key. Linking is done to the node having an array element number that is derived by adding the 0 or 1, which is the bit value of the search key at the discrimination bit position of the immediately previous branch node, to the coupled node indicator of the branch node.

Therefore, by adding the bit value of the discrimination bit position of the search key to the coupled node indicator of the immediately previous branch node, it is possible to determine the array element number of an array element storing a node at the link target.

Although in the above-noted example the smaller of the array element numbers at which the node pair is located is used as the coupled node indicator, it will be understood that it is also possible to use the larger of the array element numbers in the same manner.

Figure 1:
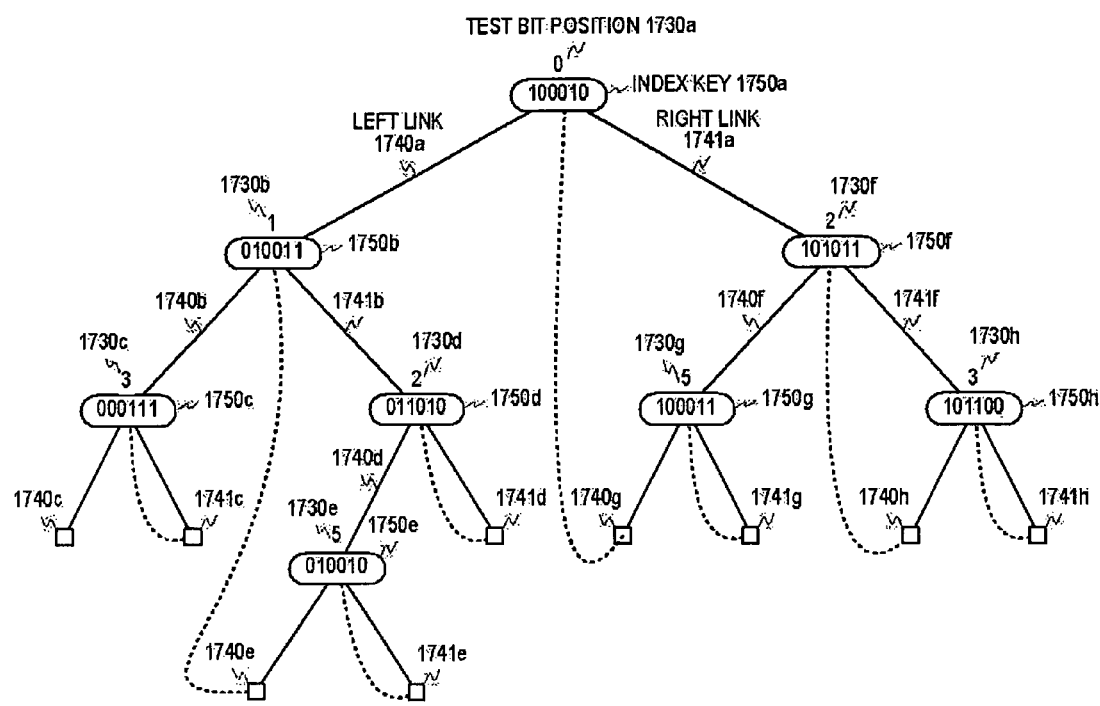
FIG. 1 is a drawing showing an example of a Patricia tree used in searching in the past.
Figure 2B:
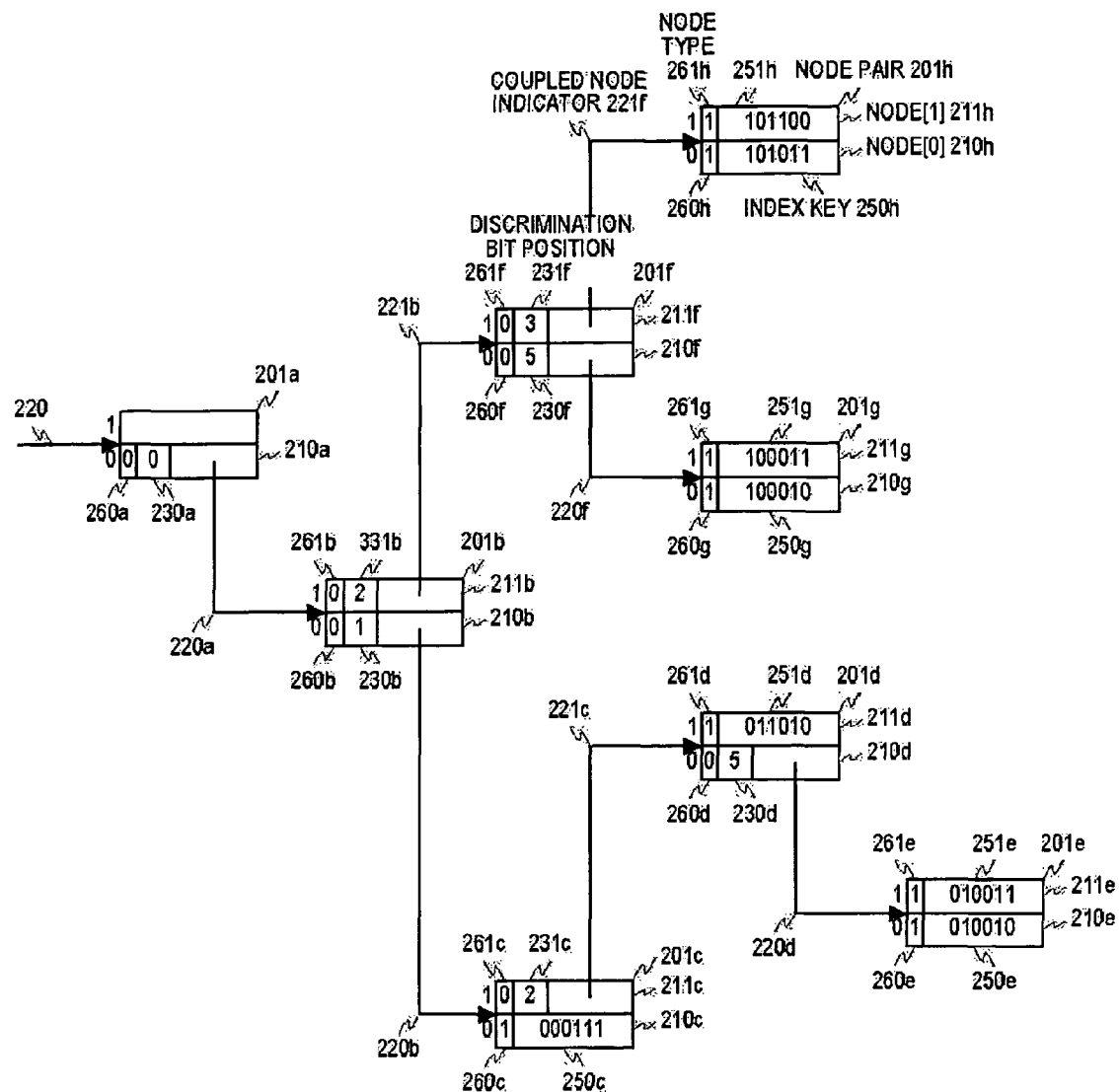
FIG. 2B is a drawing describing a tree structure of a coupled node tree.

FIG. 2B is a drawing that conceptually shows an embodiment of a tree structure of a coupled node tree. The 6-bit index key that is illustrated is the same as that of the Patricia tree shown as an example in FIG. 1.

The reference numeral 210a shows the root node. In the example shown, the root node 210a is the primary node of the node pair 201a located at the array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the codes that are appended before the array element numbers described in FIG. 1. The tree is traversed in accordance with the bit values at discrimination bit positions of the search key, so that the leaf node of the search for item is found.

In the example shown, the node type 260a of the root node 210a is 0, thereby indicating that this is a branch node, and the discrimination bit position 230a indicates 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The discrimination bit position 230b of the node 210b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes an index key. "000111" is stored in the index key 250c. The node type 261c of the node 211c is 0, the discrimination bit position 231c of the node 211c is 2, and in the coupled node indicator is stored the array element number 221c of an array element in which is stored the primary node 210d of the node pair 201d.

The node type 260d of the node 210d is 0, the discrimination bit position 230d of the node 210d is 5, and in the coupled node indicator is stored the array element number 220d of an array element in which is stored the primary node 210e of the node 201e. The node type 261d of the node 211d that is paired with the node 210d is 1, and "011010" is stored in the index key 251d.

The node types 260e and 261e of the nodes 210e and 211e of the node pair 201e are both 1, indicating that both are leaf nodes. In the index keys 250e and 251e of each are stored "010010" and "010011" respectively as index keys.

The discrimination bit position 231b of the node 211b, which is the other node of the node pair 201b, has 2 stored therein, and the array element number 221b of the array element in which is stored the primary node 210f of the node pair 201f is stored in the coupled node indicator of the link target.

The node types 260f and 261f of the nodes 210f and 211f of the node pair 201f are both 0, indicating that both are branch nodes. In the discrimination bit positions 230f and 231f of each are stored 5 and 3, respectively. The array element number 220*f* of the array element in which is stored the primary node 210*g* of the node pair 201*g* is stored in the coupled node indicator of the node 210*f*, and the array element number 221*f* of an array element in which is stored the node [0] 210*h*, which is the primary node of the node pair 201*h*, is stored in the coupled node indicator of the node 211*f*.

The node types 260*g* and 261*g* of the nodes 210*g* and 211*g* of the node pair 201*g* are both 1, indicating that both are leaf nodes, and "100010" and "100011" are stored in the index keys 250*g* and 251*g* thereof, respectively.

In the same manner, the node types 260*h* and 261*h* of the node [0] 210*h* of the node pair 201*h*, and the node [1] 211*h*, which is paired therewith, are both 1, indicating that both are leaf nodes, and "101011" and "101100" are stored in the index keys 250*h* and 251*h* thereof, respectively.

The processing flow in searching for the index key "100010" from the above-noted tree is briefly described below. The discrimination bit positions are numbered 0, 1, 2, . . . and so on from the left.

First, processing is started from the root node 201*a* using the bit string "100010" as the search key. Because the discrimination bit position 230*a* of the root node 210*a* is 0, examining the bit value of the discrimination bit position 0 reveals 1. This being the case, 1 is added to the array element number 220*a* stored in the coupled node indicator and linking is done to the node 211*b* stored in the resulting array element number. Because 2 is stored in the discrimination bit position 231*b* of the node 211*b*, examination of the bit value of the discrimination bit position 2 reveals 0, resulting in linking to the node 210*f* stored in the array element having the array element number 221*b* stored in the coupled node indicator.

Because 5 is stored in the discrimination bit position 230*f* of the node 210*f* and because examination of the bit value of the discrimination bit position 5 of the search key "100010" reveals 0, linking is done to the node 210*g* stored in the array element having the array element number 220*f* stored in the coupled node indicator.

Because the node type 260*g* of the node 210*g* is 1, indicating a leaf node, the index key 250*g* is read out and a comparison is performed with the search key, thereby revealing coincidence between the two, both of which are "100010". Searching is performed in this manner using the coupled node tree.

Next, the significance of the configuration of the coupled node tree will be described, with reference made to FIG. 2B.

The configuration of the coupled node tree is defined according to a set of index keys. In the example of FIG. 2B, the discrimination bit position of the root node 210*a* is 0 because there is an index key having a 0 at the 0th bit and an index key having a 1 at the 0th bit in the index keys shown in the embodiment example of FIG. 2B. The group of index keys having 0 at the 0th bit is classified under the node 210*b*, and the group of index keys having 1 at the 0th bit is classified under the node 211*b*.

That the discrimination bit position of the node 211*b* is 2 reflects a property of the index keys, this being that the 1st bits of all the nodes 211*h*, 210*h*, 211*g*, and 210*g* are the same value 0, a difference therebetween first occurring at the 2nd bit.

Similar to the case of the 0th bit, the cases of the 2nd bit being 1 are classified on the node 211*f* side, and the cases of the 2nd bit being 0 are classified on the node 210*f* side.

Then because index keys having a 2nd bit that is 1 differ with regard to the 3rd bit, 3 is stored in the discrimination bit position of the node 211*f*, and because the 3rd and 4th bits of index keys having 0 as the 2nd bit are the same and differ at the 5th bit, 5 is stored in the discrimination bit position of the node 210*f*.

At the link target of the node 211*f*, because there is only one having a 3rd bit of 1 and one having a 3rd bit of 0, nodes 210*h* and 211*h* are leaf nodes, with "101011" and "101100" stored in the index keys 250*h* and 251*h*, respectively.

Even in the event that the index key set includes "101101" or "101110" in place of "101100," because there is equality with "101100" up until the 3rd bit, only the index key stored in the node 211*h* would change, there being no change in the structure of the tree itself. However, if "101101" is included in addition to "101100," the node 211*h* would become a branch node, the discrimination bit position thereof being 5. If the index key to be added is "101110," the discrimination bit position would be 4.

As described above, the coupled node tree structure is determined by the bit values of each bit position of the index keys included in the set of index keys.

To add to the above, because there is branching for each bit position having different bit values, meaning between a node that has a bit value of 1 and a node that has a bit value of 0, if the leaf nodes are traversed giving priority to the node [1] side and the tree depth direction, the index keys stored therewithin will be "101100" for the index key 251*h* of the node 211*h*, "101011" for the index key 250*h* of the node 210*h*, . . . , and "000111" for the index key 250*c* of the node 210*c*, these being sorted in descending order.

That is, in a coupled node tree the index keys are disposed in the tree in a sorted sequence.

When searching using a search key, the index key is followed over a path disposed on a coupled node tree, and in the case, for example of a search key "101100" it is possible to reach the node 211*h*. As can be imagined from the above-noted description, even if the search key is made "101101" or "101110," the node 211*h* will be reached, and a comparison with the index key 251*h* will result in the search failing.

Also, even in the case in which searching is done with "100100," in the link path of nodes 210*a*, 211*b*, and 210*f*, because the 3rd and 4th bits of the search key are not used and the 5th bit is 0, the node 210*g* will be reached, similar to the case searching with "100010." In this manner, the discrimination bit positions are used in accordance with bit makeup of the index keys stored in the coupled node tree to perform branching.

Figure 3:
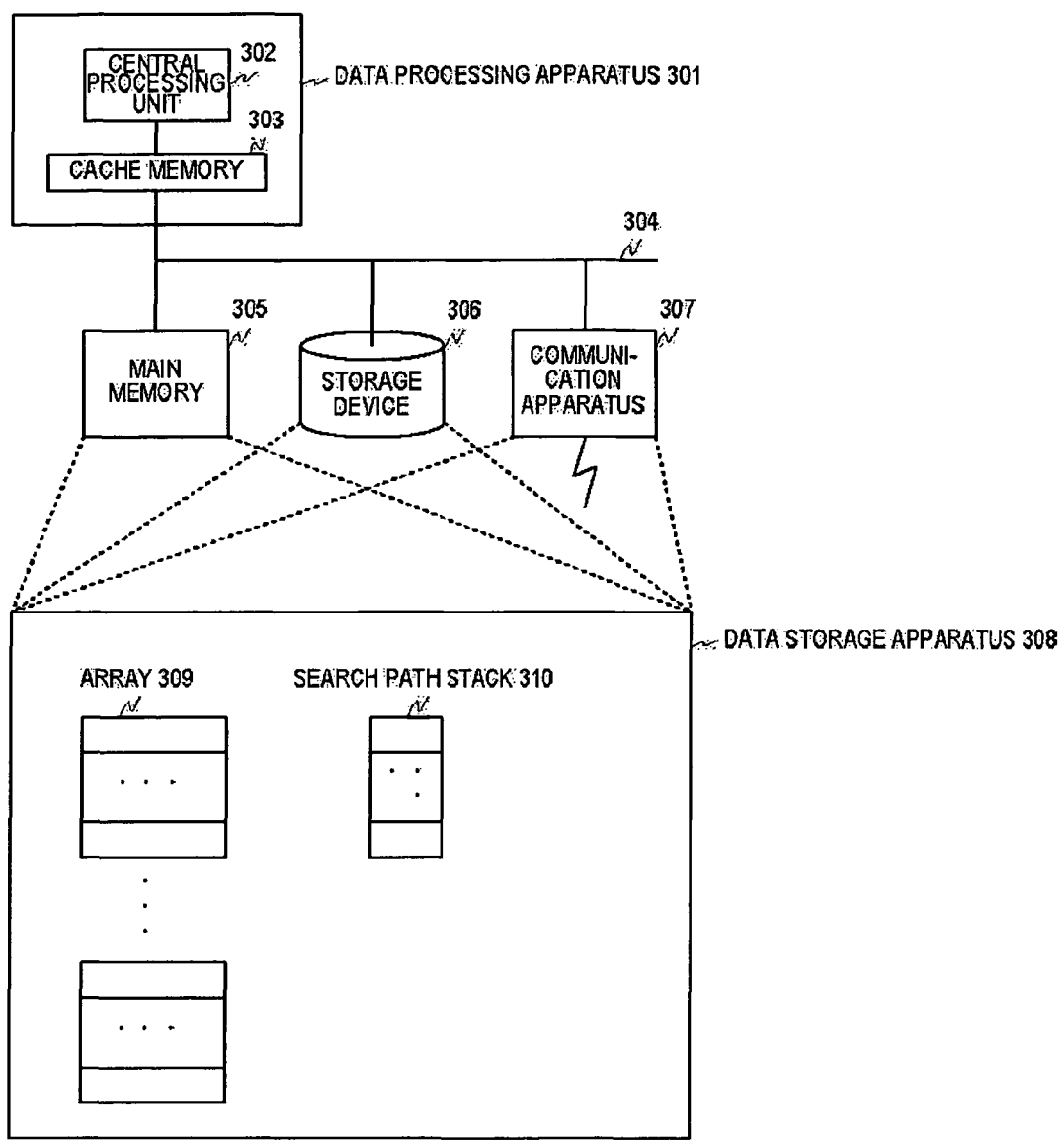
FIG. 3 is a drawing describing an exemplary hardware configuration for embodying the present invention.

FIG. 3 is a drawing describing an example of a hardware configuration for embodying the present invention.

Search processing and data maintenance including backup processing and restore processing are implemented with the backup/restore apparatus of the present invention by a data processing apparatus 301 having at least a central processing unit 302 and a cache memory 303, and a data storage apparatus 308. The data storage apparatus 308, which has an array 309 into which is disposed a coupled node tree, and a search path stack 310, into which are stored array element numbers of nodes which are traversed during the search, can be implemented by a main memory 305 or a storage device 306, or alternatively, by using a remotely disposed apparatus connected via a communication apparatus 307.

The array 100 in FIG. 2A is one embodiment of the array 309.

In the example shown in FIG. 3, although the main memory 305, the storage device 306, and the communication apparatus 307 are connected to the data processing apparatus 301 by a single bus 304, there is no restriction to this connection method. The main memory 305 can be disposed within the data processing apparatus 301, and can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing.

Next, the basic search processing using the coupled node tree proposed by this inventor in the previously cited patent application and some of the applied processing, such as the processing that obtains the maximum/minimum values for the index keys included in the coupled node tree, will be introduced to the extent necessary to understand this invention.

Figure 4:
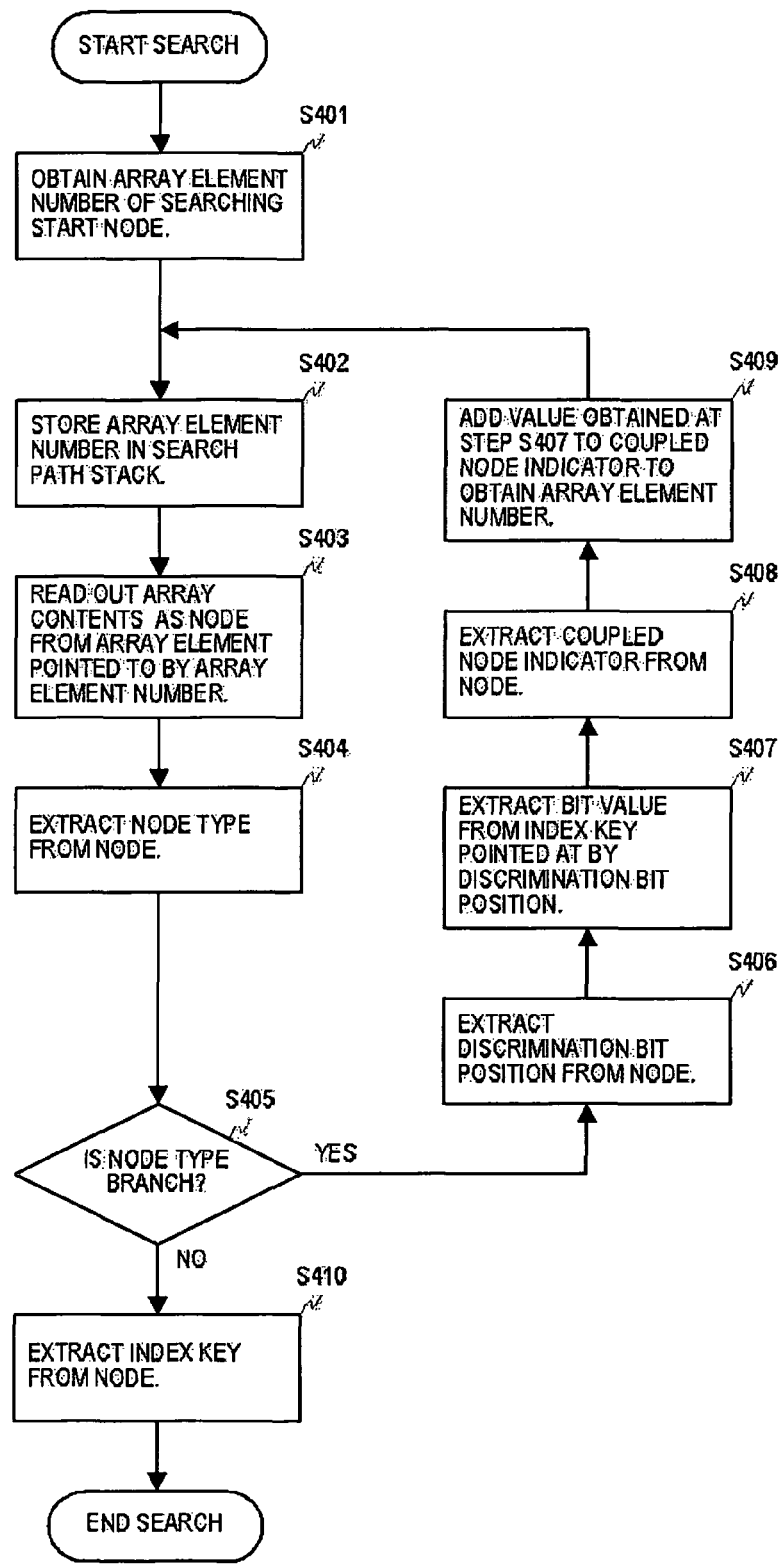
FIG. 4 is a flowchart showing the search processing related to the present invention.

FIG. 4 is a flowchart showing the basic operations of the bit string search processing proposed by these applicants in the above cited application 2006-293619.

First, in step S401 the array element number of the search start node is acquired.

The search start node can be any node configuring the coupled node tree and it is stored in the array position that corresponds to the acquired array element number.

How the search start node is specified will be described later in the descriptions of the various search applications.

Next, at step S402, the array element number acquired is stored on the search path stack 310. Proceeding to step S403, the array element of the array element number is read out as a node to be referenced. At step S404, the node type is extracted from the read out node. Next at step S405, a determination is made as to whether the node type is a branch node or not.

If the determination made at step S405 is that the node type is a branch node, processing proceeds to step S406. At step S406, the discrimination bit position is extracted from the node. Next, at step S407, the bit value of the search key at the discrimination bit position extracted at step S406 is obtained. Next, proceeding to step S408, the array element number of the primary node of the node pair of the link target is obtained from the node. Then, proceeding to step S409, the bit value obtained at step S407 is added to the array element number obtained at step S408, thereby obtaining the array element number of the link target node, and return is made to step S402.

Thereafter, the processing from step S402 to step S409 is repeated until the determination at step S405 is that the node is a leaf node and processing proceeds to step S410. At step S410, the index key is extracted from the leaf node, and processing ends.

Figure 5:
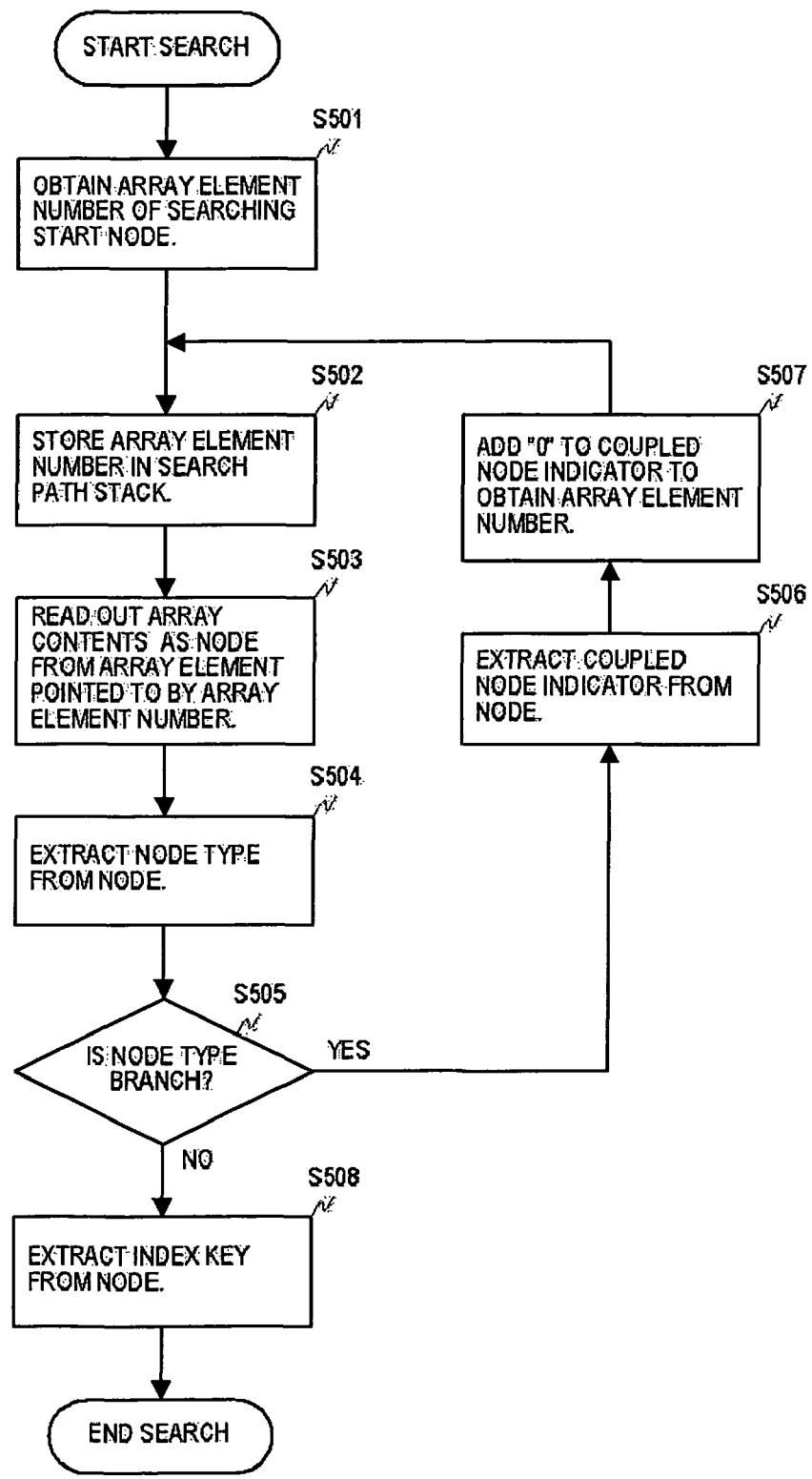
FIG. 5 is a drawing showing the processing when requesting the minimum key value stored in a coupled node tree.

The flowchart in FIG. 5 is the flowchart for obtaining the minimum value of the index keys stored in a coupled node tree (including subtrees) proposed in Japanese Patent Application 2006-293619, previously filed by the applicants of the present invention.

As was noted above regarding the position of the index keys on the tree, the processing to obtain the minimum value of the index keys is equivalent to traversing nodes [0] from the search start node until a leaf node is reached.

First, the processing from the acquiring of the array element number of the search start node at step S501 until the node type determination at step S505 is similar to the processing from step S401 to step S405 of FIG. 4.

If the node type is determined to be branch node at the node type determination made at step S505, processing proceeds to step S506, at which the primary node indicator of the array is extracted from the node and, at step S507, the value "0" is added to the extracted primary node indicator and taken as the new array element number, after which return is made to step S502. Thereafter, the processing from step S502 to step S507 is repeated until the node is determined to be leaf node at step S505, and at step S508 the index key is extracted from the leaf node, at which time processing ends.

In the above-noted processing shown in FIG. 5, in order to traverse the node [0], "0" is always added to the coupled node indicator. That is, according to the processing of FIG. 5, the node of a link target is always taken as the node [0] of a node pair, and branching is done to the node storing the index key with the smaller value. By doing this, the tree structure enables extraction of the minimum index key of the coupled node tree, which is a sequentially configured as described above.

Figure 6:
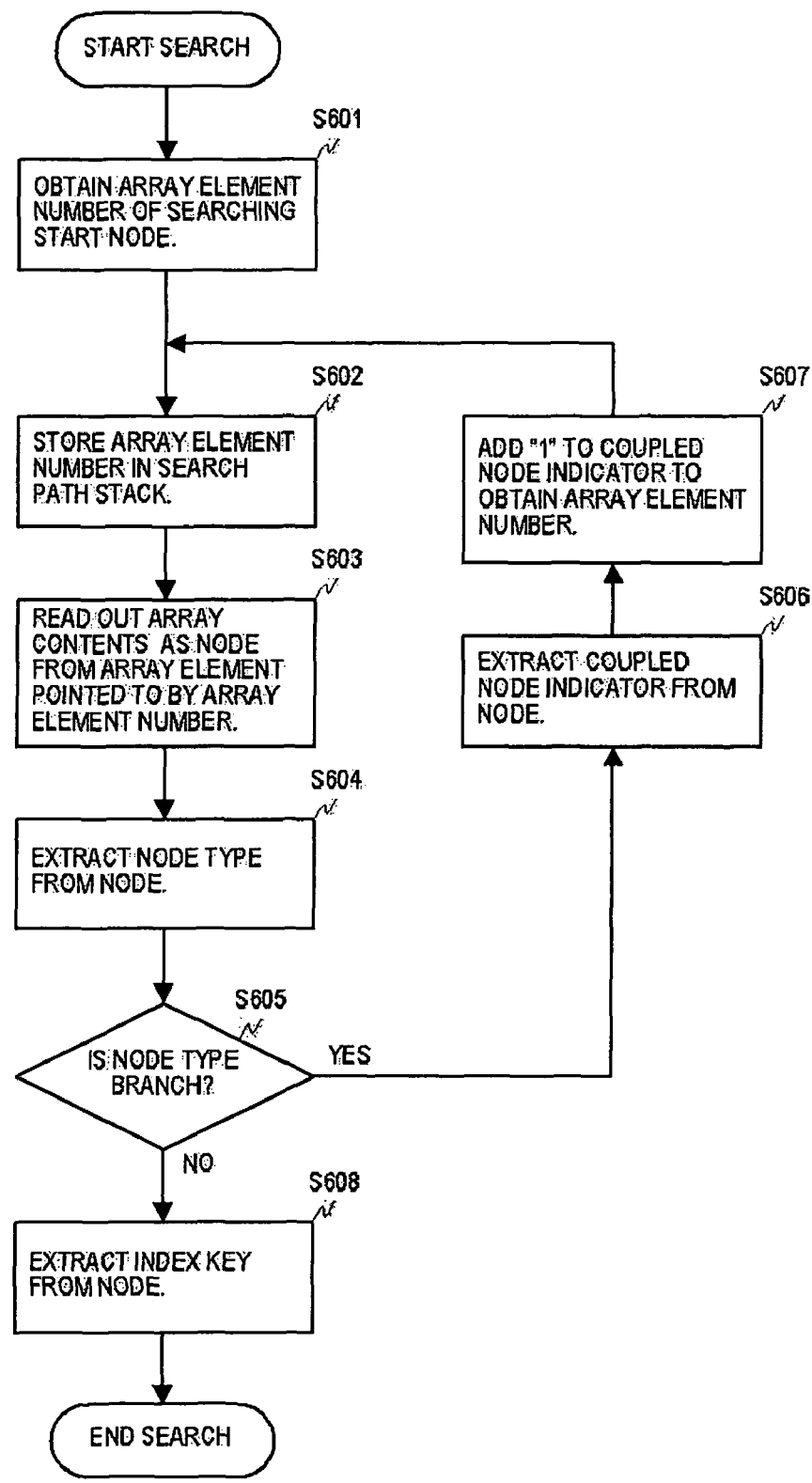
FIG. 6 is a drawing showing the processing when requesting the maximum key value stored in a coupled node tree.

The flowchart in FIG. 6 is the flowchart for obtaining the maximum value of the index keys stored in a coupled node tree (including subtrees) proposed in Japanese Patent Application 2006-293619, previously filed by the applicants of the present invention.

The processing to determine the maximum index key value corresponds to sequentially traversing up until a leaf node, with regard to the node [1] of the nodes of the tree. The processing for determining the maximum index key is described below, with a comparison being made to the determining of the minimum index key, focusing on the points of difference therebetween.

Of the processing sequence shown in FIG. 6, the processing from step S601 to step S606 and that of step S608 corresponds, respectively to, and performs similar processing as, the processing from step S501 to step S506 and that of step S508 in FIG. 5. The difference with respect to the processing in FIG. 5 for determination of the minimum value is that, at step S607, the value "1" is added to the primary node indicator. By doing this, linking is always done to the node [1] of a node pair expressed by the primary node indicator, and by repeating the processing successively from step S602 to step S607, it is possible to obtain the maximum value of the index key.

As shown in FIG. 4 to FIG. 6, when executing the basic operations of searching for an index key that coincides with a search key and search processing for the minimum/maximum value of the index keys, the array element numbers and the discrimination bit position of branch nodes of the array elements referred to are successively stored in the search path stack 310.

Although, in the index key minimum/maximum value search processing described above referencing FIG. 5 and FIG. 6, the coupled node tree was described as being arranged in an array, it is clear that it is not necessary for the coupled node tree to be arranged in an array, and that a search for the minimum value/maximum value of the index keys can be enabled by linking only to primary nodes of a node pair of the link target or only to nodes at a position in a memory area adjacent thereto until the leaf node is reached.

Figure 7:
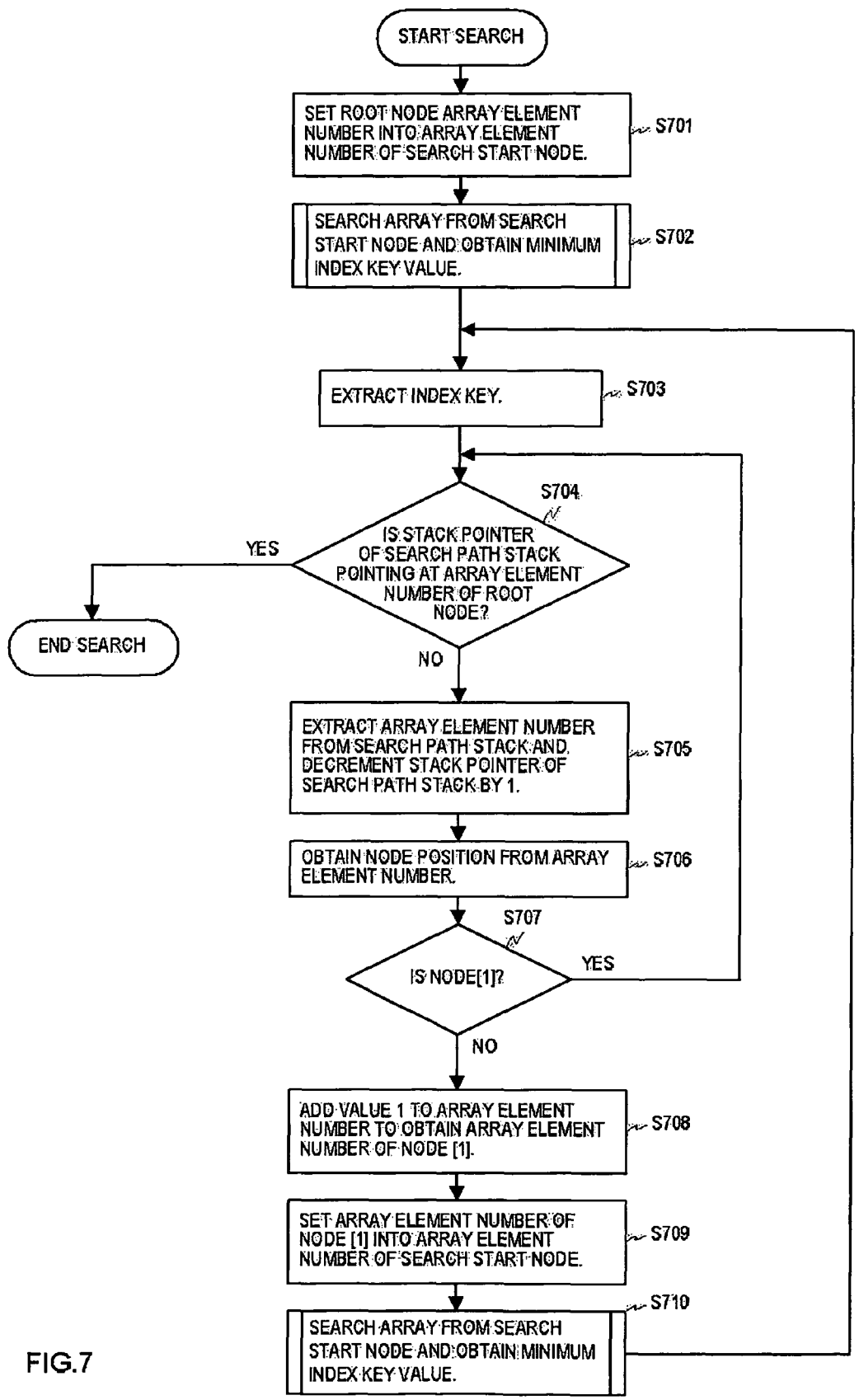
FIG. 7 is a flowchart showing the processing when fetching, in ascending order, index key values stored in a coupled node tree.

FIG. 7 is the flowchart showing the process to extract, in ascending order, index keys stored in the coupled node tree proposed in Japanese Patent Application 2006-293619, previously filed by the applicants of the present invention.

The process to extract index keys in ascending order is equivalent to traversing the nodes successively, giving priority to the node [0] side of the node pairs and the tree depth direction, and extracting the index key from each leaf node.

First, in step S701, the array element number of the root node is set in the array element number of the search start node, and in step S702 the process to obtain the minimum index key explained using references to the above FIG. 6 and FIG. 7 is executed, and the minimum index key of all the index keys included in the coupled node tree is acquired.

Then the index key acquired in step S703 is read out and processing proceeds to step S704.

In step S704, the search path stack 310 is referenced and a determination is made whether the stack pointer is pointing to the array element number of the root node.

If the array element number pointed to by the pointer is other than that of the root node, processing proceeds to step S705.

Then, in step S705, after extracting the array element number pointed to by the pointer from the search path stack 310, the pointer is decremented by 1.

The reference to the search path stack 310 in step S704 above and the decrementing of the pointer after extracting the array element number pointed to by the pointer from the search path stack 310 in step S705 are executed by a pop operation on the stack.

The same method applies to reading out array element numbers from the stack for each of the embodiments of the invention herein below.

In step S706, the node position of whichever of the two nodes in the node pair the array element is stored can be obtained from the array element number extracted in step S705.

For example, by storing node [0] in the array element with an even position number in the array or other such, the node position can be obtained from array element number.

Then, in step S707 a determination is made as to whether the node position obtained in step S706 is the node [1] side of the node pair or not.

If in step S707 the determination is that it is the node [1] side, returning to step S704, processing is repeated from step S704 to step S707 until the node of the array element number pointed to by the pointer is either node [0] or the root node.

When in step S707 the determination is that it was a node [0] part, proceeding to step S708, "1" is added to the array element number and the array element number of the node [1] paired with that node is obtained.

Then, in step S709, the array element number of node [1] obtained in step S708 is set as the search start node and in step S710, the processing to obtain the minimum index key from the subtree with the search start node as its root node is executed.

The processing in step S710 is the same as that in step S702 and the minimum value search processing shown in FIG. 6 is used.

When the minimum index is requested in step S710, returning to step S703, the requested index key is extracted and from then on, the same process is repeated until a determination can be made in step S704 that the pointer points to the array element number of the root node.

In this way, the array element number pointed by the pointer of search path stack 310 is referenced, and the node [1] that is a pair with the node [0] with the array element number stored in search path stack 310 is made the search start node and the minimum index key underneath that key is obtained.

At the stage in step S702 wherein the minimum value is obtained, the pointer of search path stack 310 points to the array element number of the node that includes the minimum index key in the coupled node tree.

Next a pop operation is executed on the search path stack 310 and the node [1] of the nodes for the array element number extracted is made the search start node and the minimum value for the index keys in the subtree for which the index start key is the root node is obtained, and the pop operations and minimum value search processing is repeated until the pop operation on search path stack 310 extracts the array element number of the root node of the coupled node tree.

Firstly in step S702, by obtaining the minimum value of the nodes underneath the root node, the array element numbers of the link path are successively stored in search path stack 310.

For this reason, when the pointer for search path stack 310 is decremented by "1", and the node [1] is obtained that pairs with a node [0] which is among those nodes whose array element number is pointed to by the new pointer, and minimum value search processing is successively executed on the nodes beneath node [1], the index keys are extracted in ascending order.

Figure 8:
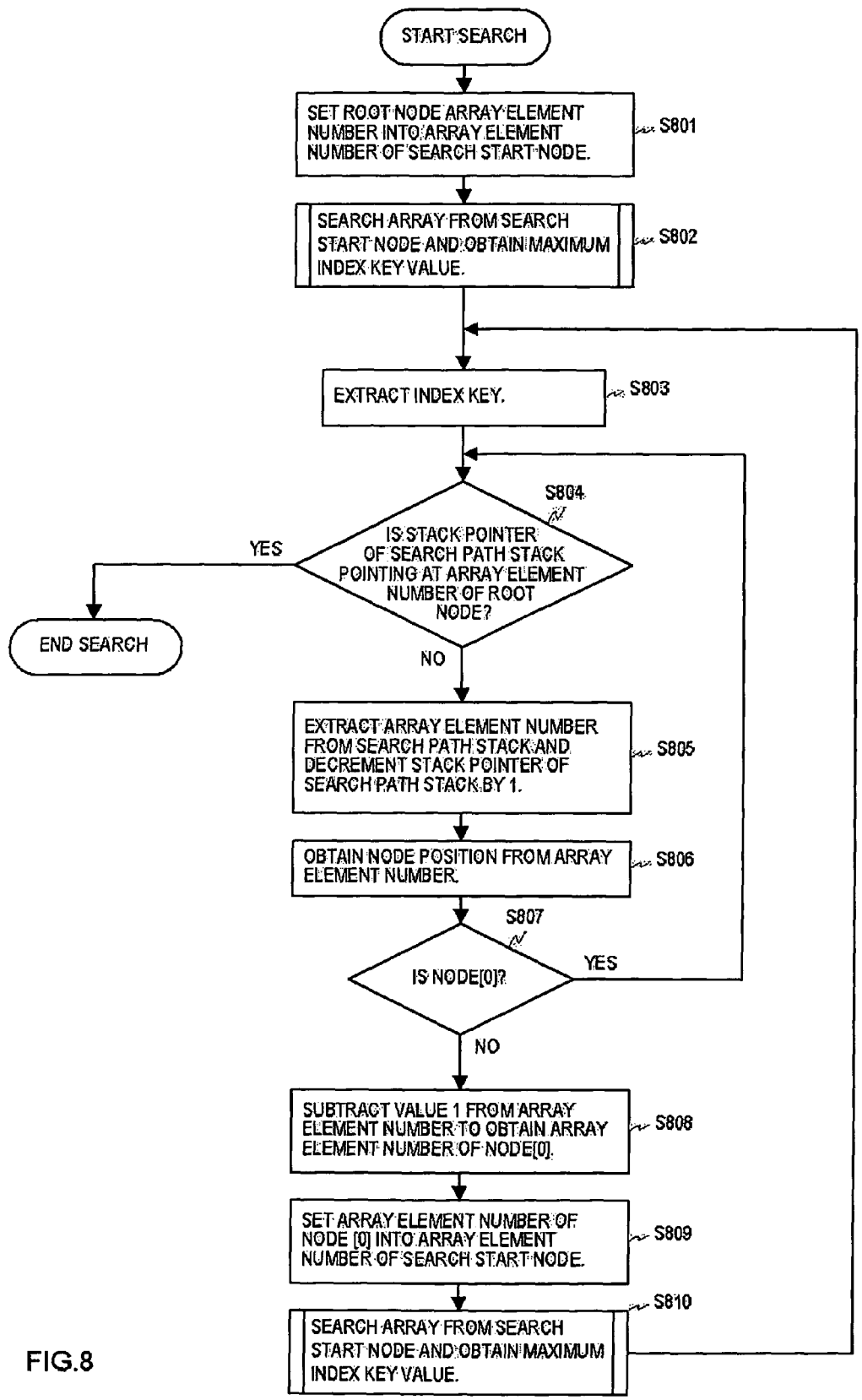
FIG. 8 is flowchart showing the processing when fetching, in descending order, index key values stored in a coupled node tree.

FIG. 8 is a flowchart showing the processing for extracting, in descending order, the index keys stored in a coupled node tree.

The process for extracting index keys in descending order corresponds to traversing from the root node sequentially to a leaf node, giving priority to the node [1] side and the tree depth direction, Here, the processing will be explained focusing on the points of difference in comparison with the extract processing of index keys in ascending order in FIG. 7.

In contrast to the above extract processing of index keys in ascending order, wherein, in step S702 and step 710 of FIG. 7, the minimum value of the index keys beneath the node with the array element number pointed to the pointer is obtained, the value obtained in step S802 and step S810 in FIG. 8 is the maximum value of the index keys beneath the node with the array element number pointed to the pointer.

Also, after the desired index key is extracted in step S703 of FIG. 7, the array element number of the node [0] of the array element numbers stored in search path stack 310 is obtained, the node [1] paired with that node is set as the search start node, and minimum value search processing is executed.

In contrast to that, in the descending order extraction processing of FIG. 8, after the desired index key is extracted in step S803, the array element number of the node [1] of the array element numbers stored in search path stack 310 is obtained, the node [0] paired with that node is set as the search start node, and maximum value search processing is executed.

Next, FIG. 9A to FIG. 9C and FIG. 9D will be used to described the node insert processing in a coupled node tree proposed in Japanese Patent Application 2006-187827, previously filed by the applicants of the present invention.

Figure 9A:
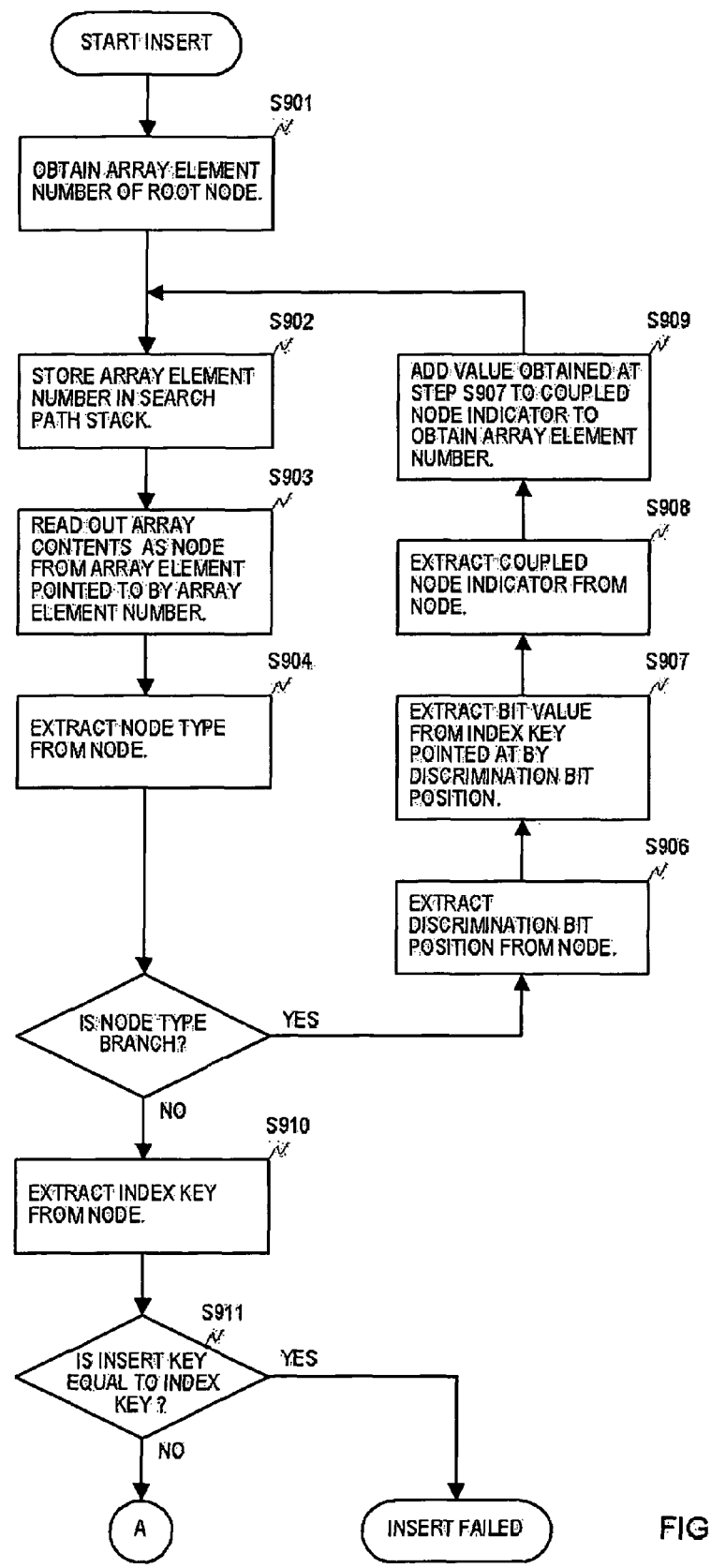
FIG. 9A is a drawing showing the flow of search processing, which is the first stage of the insertion processing.
Figure 9B:
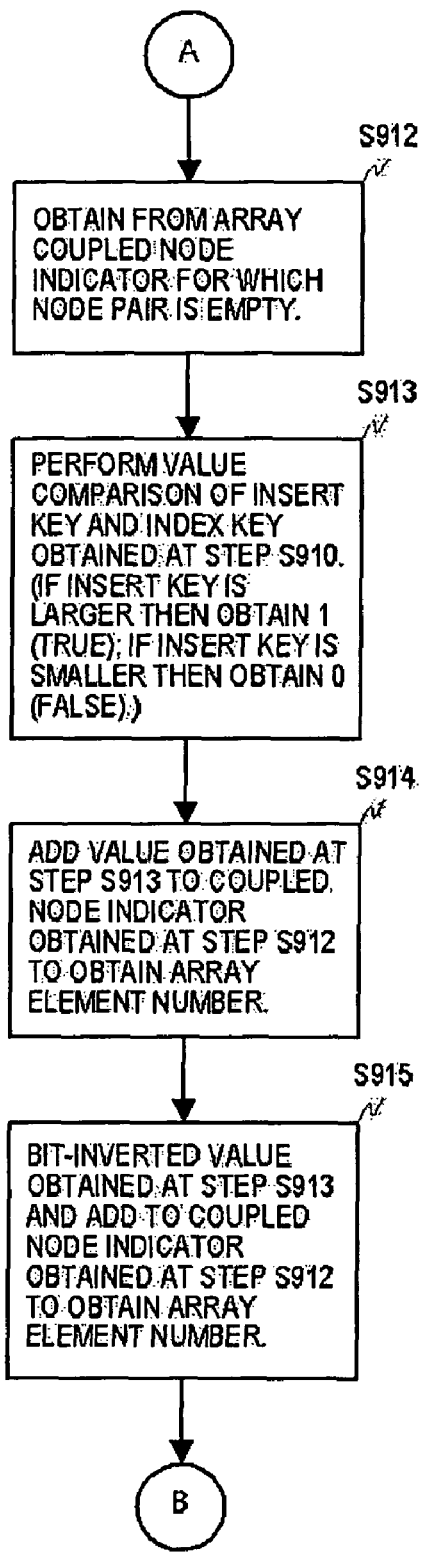
FIG. 9B is a process flow drawing describing the processing flow for preparing array elements for a node pair to be inserted.
Figure 9C:
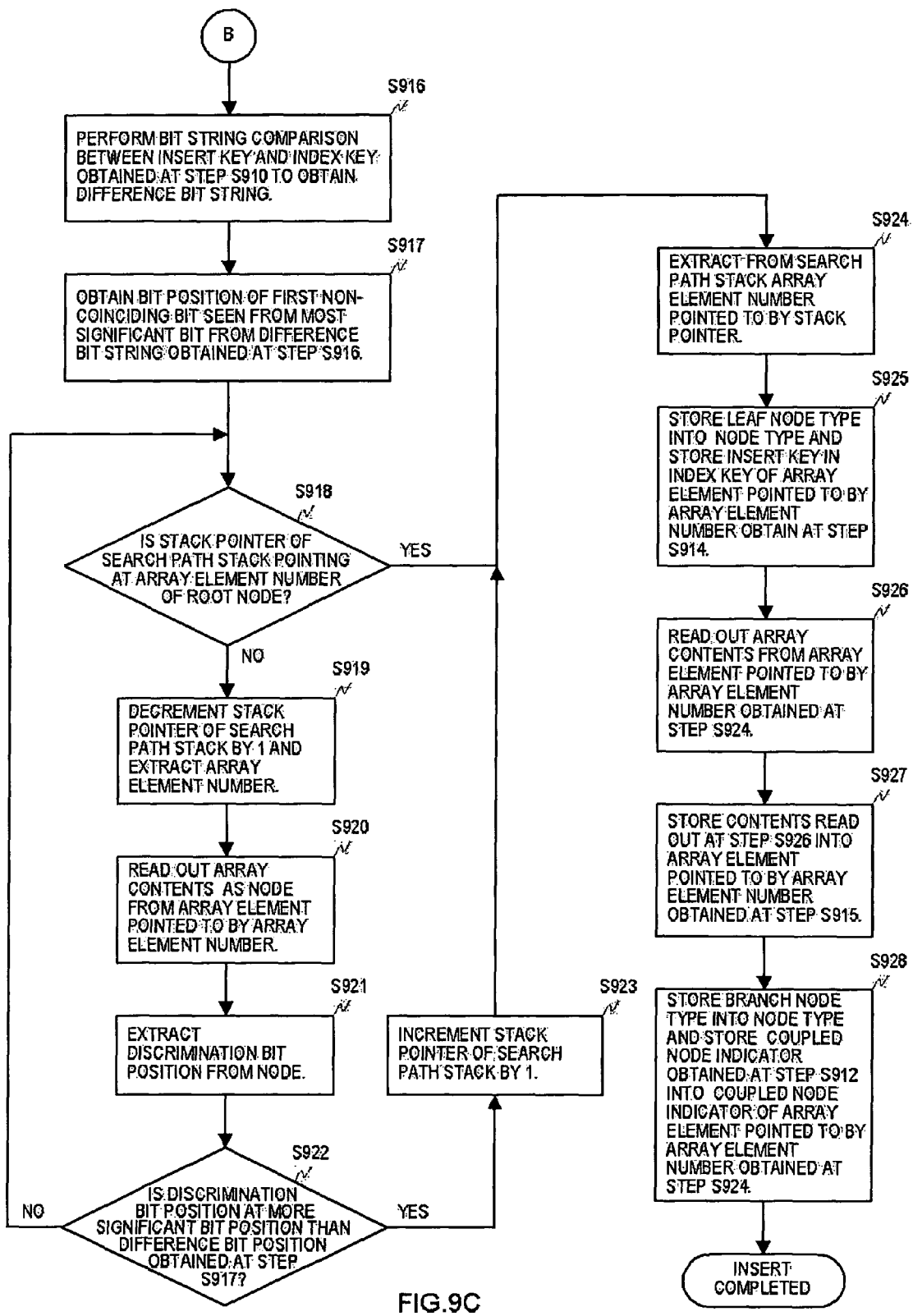
FIG. 9C is a drawing showing the processing flow for determining the position at which a node pair is to be inserted, and the storing of the contents of each node of the node pair to complete the insertion processing.
Figure 9D:
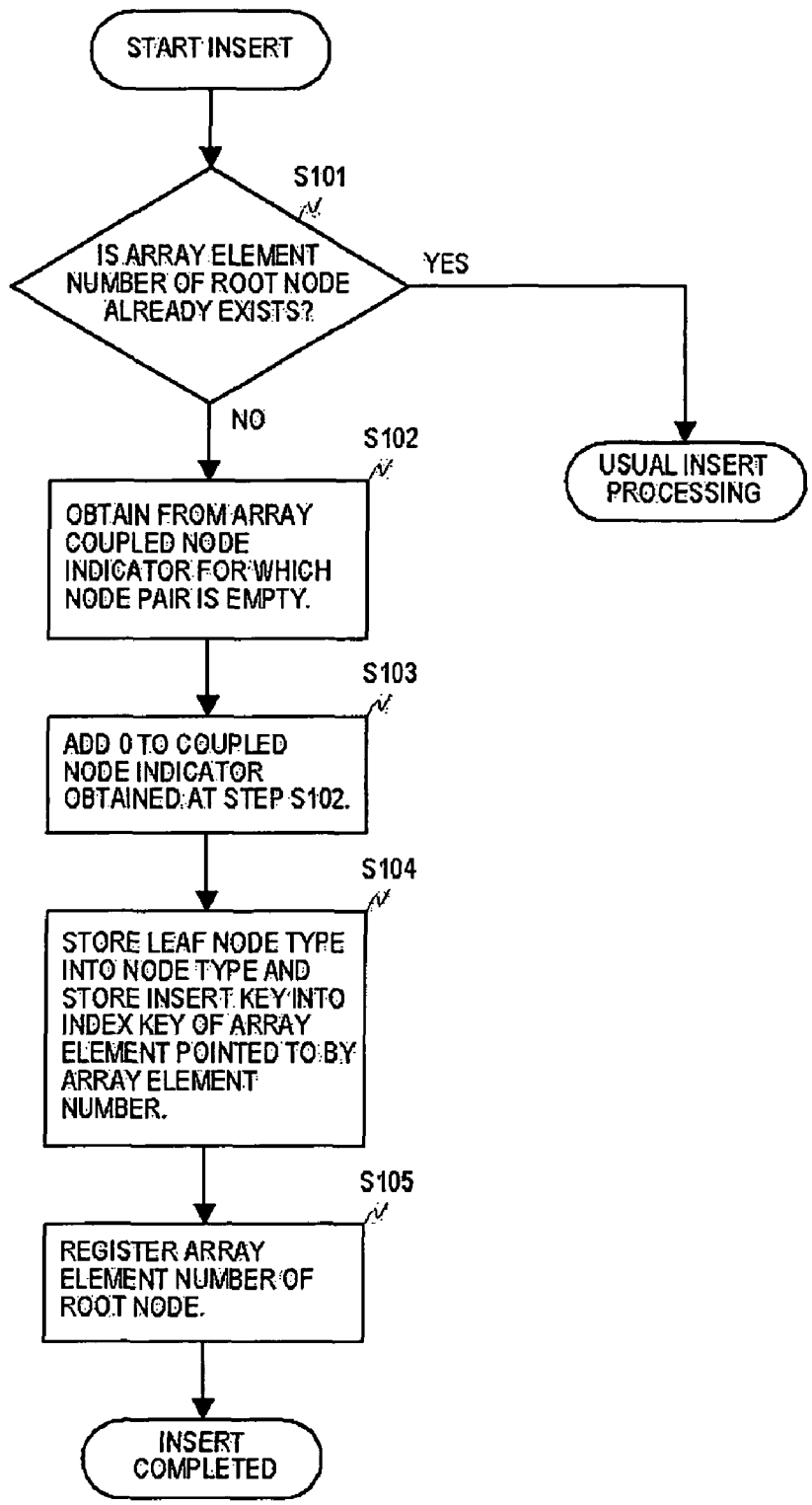
FIG. 9D is a processing flow diagram describing the overall node insertion processing for a case in which an index key is added, including root node insertion processing.

FIG. 9A to FIG. 9C describe the usual insert processing, and FIG. 9D describes the processing for insert of a root node. By root node insert processing and usual insert processing, because a coupled node tree is generated, the description of the node insert processing is also a description of the processing to generate a coupled node tree.

FIG. 9A is a drawing showing the processing flow for search processing, which is the first stage of insertion processing, this corresponding to the using of an insertion key as a search key in the search processing shown in FIG. 4.

Because step 901 corresponds to step 401 of FIG. 4 with the root node taken as the search start node and the processing of step S902 to step S910 corresponds completely to step S402 to step S410 of FIG. 4A, these steps will not be described herein.

At step S911 in FIG. 9A, a comparison is performed between the insertion key and the index key and, because if there is equality the insertion key already exists in the coupled node tree, the insertion fails, and processing ends. If, however, there is no equality, processing proceeds to step S912 and thereafter in FIG. 9B.

FIG. 9B is a processing flowchart describing the processing to prepare an array element number for a node pair to be inserted.

At step S912, empty node pairs are obtained from the array, and the array element number of the array element to be made the primary node of the node pair is acquired.

Proceeding to step S913, a size comparison is performed between the insertion key and the index key acquired at step S510 and, if the insertion key is larger, the Boolean value 1 is obtained, but if the insertion key is smaller, the Boolean value 0 is obtained.

Proceeding to step S914, the Boolean value obtained at step S913 is added to the array element number of the primary node obtained at step S912 to obtain an array element number.

Proceeding to step S915, the logical negation value of the Boolean value obtained at step S913 is added to the array element number of the primary node obtained at step S912 to obtain an array element number.

The array element number obtained at step S914 is the array element number of the array element into which a leaf node having the insert key as an index key is stored, and the array element number obtained at step S915 is the array element number into which a node that formed a pair with that leaf node is stored.

That is, by means of the value relationship between the index key stored in the leaf node obtained by the first stage of search processing and the insertion key, a determination is made as to what node of the node pair wherein is to be inserted the branch node holding the insertion key is to be stored.

For example, in the case in which "011011" is to be inserted into the coupled node tree of FIG. 2B, the index key resulting from the search is the "011010" that is stored in node 211d. A Boolean value is obtained by performing a value comparison between the insertion key "011011" and the index key "011010" stored in the node 211d, and, in this example, because the insertion key is larger, the Boolean value 1 is obtained, so that the leaf node that holds the insertion key is stored in an array element having an array element number obtained by adding 1 to the coupled node indicator of the node pair to be inserted. The index key "011010" is stored in an array element having an array element number obtained by adding the logical negation value of the Boolean value obtained by the size comparison to the coupled node indicator.

When this is done, because the index key "011010" and the insertion key "011011" differ at the 5th bit, the node 211d is a branch node, with a discrimination bit position of 5, that is the array element number of a primary node of a node pair into which the coupled node indicator is inserted.

In the case also in which "011001" is to be inserted into the coupled node tree of FIG. 2B, the index key resulting from the search is "011010" that is stored in node 211d. In this case, because the insertion key is smaller, the Boolean value 0 is obtained, so that the leaf node that holds the insertion key is stored in an array element having an array element number obtained by adding 0 to the coupled node indicator of the node pair to be inserted. Then, because the index key "011010" and the insertion key "011001" differ at the 4th bit, the node 211d is a branch node with a discrimination bit position of 4, that is, the array element number of a primary node of a node pair into which the coupled node indicator is inserted.

Next, processing proceeds to the processing of step S916 and thereafter in FIG. 9C.

FIG. 9C is a drawing showing the processing flow of storing a node in the array prepared as shown in FIG. 9B, determining the insertion position therein, and changing the contents of an existing node to complete the insertion processing.

The processing from step S916 to step S923 is processing to determine the position on the coupled node tree for insertion of a node pair, and the processing of step S924 and thereafter is processing for setting data in each node and completing the insertion processing.

At step S916, an exclusive-OR, for example, is obtained of the insertion key and the index key obtained at step S910 so as obtain a difference bit string.

Proceeding to step S917, from the difference bit string obtained at step S916 the first bit position starting from the most-significant 0th bit at which there is a non-coincidence is obtained. This processing can be performed by, for example, a CPU having a priority encoder, the difference bit string being input thereto and the difference bit positions being obtained. It is alternatively possible to perform the equivalent processing using software, to obtain the first bit position at which there is non-coincidence.

Next, proceeding to step S918, a determination is made as to whether the stack pointer of the search path pointer is pointing at the root node array element. If it is, processing proceeds to step S924, but if it is not processing proceeds to step S919.

At step S919, the stack pointer of the search path stack is decremented by 1, and the discrimination bit position stacked at that point is extracted.

Proceeding to step S920, the array element with the array element number obtained in step S919 is read out from the array as a node.

Proceeding to step S921, the discrimination bit position is obtained from the node read out in step S920.

Next, proceeding to step S922, a judgment is made as to whether the discrimination bit position read out at step S920 is of higher order than the bit position obtained at step S917. In this case, the term higher order means more to the left in the bit string, that is, having a lower bit position value.

If the result of the judgment at step S922 is negative, return is made to step S918, and repetition is done until either the judgment at step S918 is affirmative or the judgment at step S922 is affirmative. When an affirmative judgment results at step S922, at step S923 the stack pointer search path stack is incremented by 1, and processing proceeds to the processing of step S924 and thereafter.

In the above-described processing at step S916 to step S923, in order to determine the position of insertion of a node pair, a bit string comparison is performed between the index key that is to be inserted and index key acquired by searching, and then a check is made of the relative positional relationship between the leading (most significant) bit position at which the bit value is different in the bit string comparison and the discrimination bit position of the branch node stored in the search path stack. The next branch node link target of the branch node at which the discrimination bit position is more significant is made the insertion position for the node pair to be inserted.

For example, when inserting "111000" into the coupled node tree of FIG. 2, the index key resulting from the search is the "101011" stored in the node 210h. A bit string comparison between the insertion key "111000" and the index key "101011" stored in the node 210h obtains the bit position 1 as the most significant bit position of a bit value that is different. The search path stack is successively traversed in reverse until the relative position relationship between the obtained bit position 1 and the discrimination bit position of the branch node stored in the array element having an array element number stored in the search path stack is such that the discrimination bit position is more significant, so that the root node 210a is reached. At that point the search path stack pointer is incremented by 1 to obtain the array element number of the node 211b. The insertion key "111000" is inserted into the link target of the node 211b.

If the root node is reached by traversing the search path stack in reverse but the discrimination bit position of the root node is not a bit position that is more significant than the bit position of the most significant bit having a different bit value in the previously determined bit string comparison, this is the case in which at the upper-order bit of the index key of the coupled node tree the bits that are more significant than the discrimination bit position of the root node all have equal values. This means that in the index key to be inserted, there is the first bit value that differs with the value of a bit that is more significant that the discrimination bit position of the root node. Therefore, the node pair to be inserted becomes the direct link target of the root node, and the discrimination bit position of the root node changes to the position of the most significant bit of the insertion key, which differs in value from the existing index key.

Next, the processing of step S924 and thereafter, which is the processing to set data at each node and complete the insertion processing, will be described.

At step S924, the array element number that is pointed to by the stack pointer of the search path stack is extracted.

At step S925, 1 (leaf node) is stored in the node type of the array element pointed to by the array element number obtained at step S914 and the insert key is stored in the index key.

Proceeding to step S926, the array element at the array element number obtained at step S924 is read out from the array.

Next, at step S927, the contents read out at step S926 are stored in the array element having the array element number obtained at step S915.

Finally, at step S928, 0 (branch node) is stored in the node type of the array element pointed to by the array element number obtained in step S924, the bit position obtained at step S917 is stored in the discrimination bit position, the array element number obtained at the step S912 is stored in the coupled node indicator, and processing is terminated.

In the above-described example of inserting "111000" into the coupled node tree of FIG. 2B, the contents of node 211b are written into the node [0] of the empty node pair that was acquired (step S927) and the node [1] thereof was made a leaf node that holds "111000" (step S925). The bit position 1 of the most significant bit that is the bit value that differs in the bit string comparison is stored in the discrimination bit position of the node 211b, and the array element number of the array element stored in the primary node of the acquired node pair is stored into the coupled node indicator (step S928).

FIG. 9D is a processing flow diagram describing the overall node insertion processing for the case in which an index key is to be inserted, including processing for insertion of a root node, proposed in the above cited Japanese Patent Application 2006-187827, and previously filed by the applicants of the present invention.

At step S101, a judgment is made as to whether the array element number of a root node of a coupled node tree that is to be acquired as already been registered. If it has already been registered, the usual insertion processing described using FIG. 9A to FIG. 9C is performed.

At step S101, if the judgment is that the registration has not yet been done, this is the case of the generation and registration of a completely new coupled node tree.

First, at step S102, an empty node pair is requested from the array, and the array element number of the array element to be made the primary node is acquired from the node pair. Next at step S103, the array element number is determined by adding 0 to the array element number obtained at step S102. (In actuality, this is equal to the array element number acquired in step S102). Further, at step S104, 1 (leaf node) is stored in the node type of the root node of the array element having the array element number obtained at step S103, and the insertion key is stored in the index key, and at step S105 the processing is completed by registering the array element number of the root node acquired at step S102.

As described above, it will be understood that when there is a set of index keys, the index keys are successively extracted therefrom, and the processing of FIG. 9D and FIG. 9A to FIG. 9C is repeated so as to enable the creation of a coupled node tree according to the present invention corresponding to the set of index keys.

Although the technology that is presupposed for the backup/restore processing of a preferred embodiment of this invention was explained above, if necessary, refer to the textual details and drawings described in the above patent applications.

Next the coupled node tree backup/restore processing of a preferred embodiment of this invention is explained.

Figure 10A:
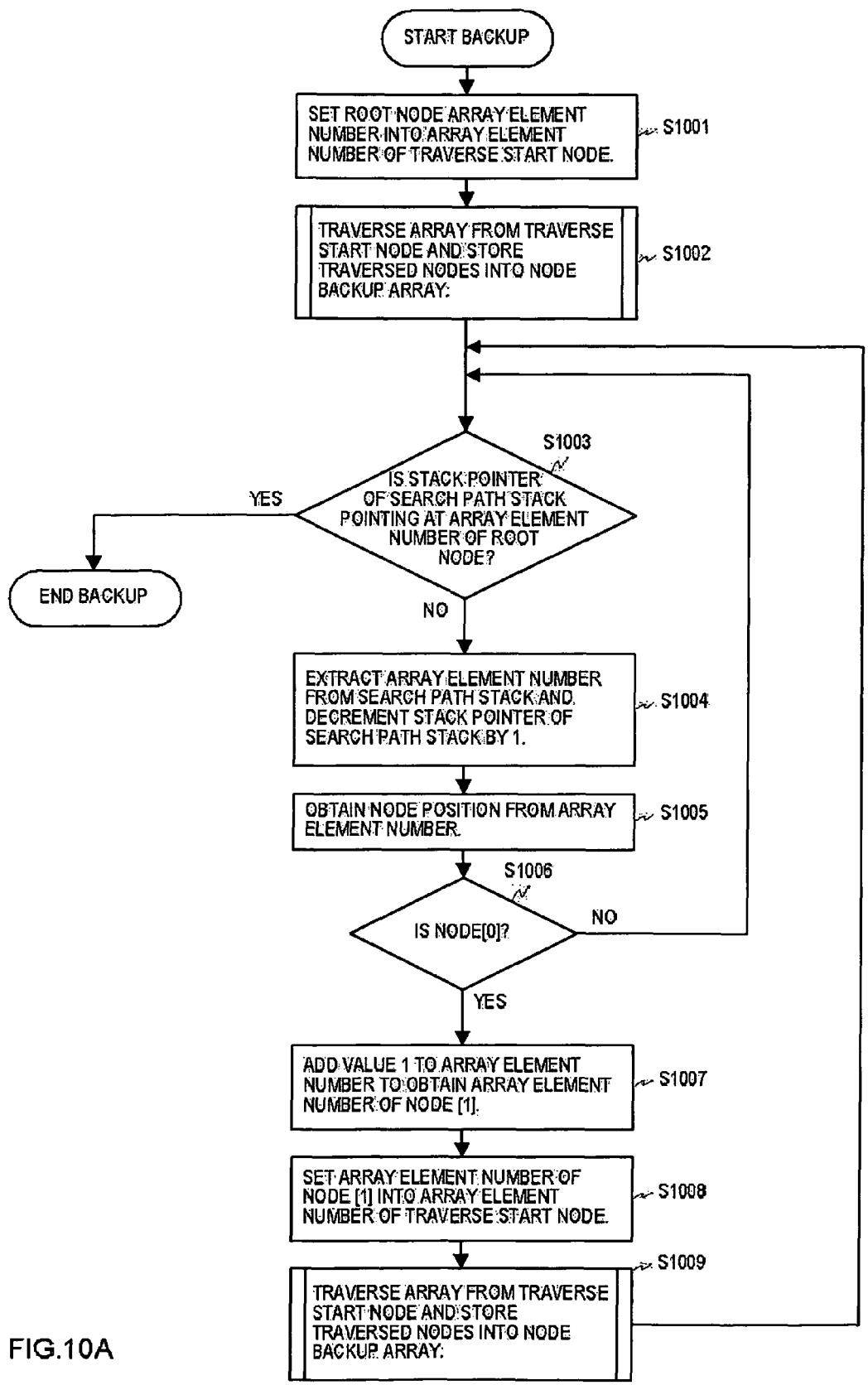
FIG. 10A is a flowchart showing the backup processing in a preferred embodiment of the present invention.
Figure 10B:
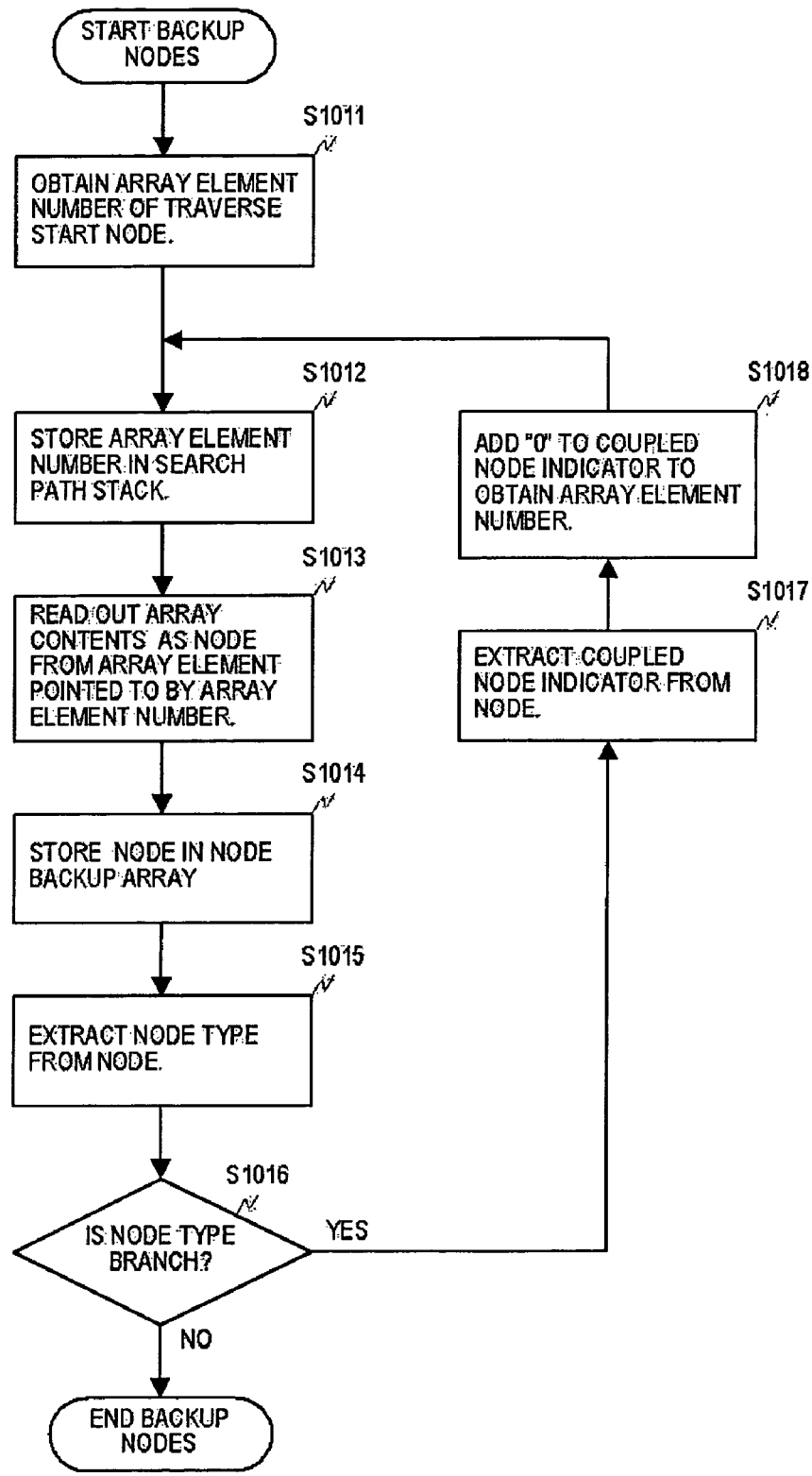
FIG. 10B is a flowchart showing the processing to backup nodes in a preferred embodiment of the present invention.

FIG. 10A and FIG. 10B are flowcharts showing the backup processing for backup a coupled node tree in a preferred embodiment of the present invention.

In this embodiment, each of the nodes of the coupled node tree arranged in array 309 are traversed, giving priority to the node [0] side of the node pairs and the tree depth direction, and the traversed nodes are backed up in the node backup array 401.

Node backup array 401 is an array used as a storage area for backup in this embodiment.

Since the point of traversing the nodes in a search sequence giving priority to the depth direction is shared with the process of obtaining index keys in ascending order referenced in FIG. 7, FIG. 10A is similar to FIG. 7.

First, in step S1001, the array element number of the root node is set as the traverse start node.

That is to say, a work area is prepared for setting the array element number of the traverse start node and the array element number of the root node is set in that work area.

Next, in step S1002, the processing of FIG. 10B, which will be described later, is executed, and, only traversing nodes [0], the path is traversed from the traverse start node to a leaf node, and the nodes traversed are successively stored in the node backup array 401.

The processing of steps S1001 and S1002 is similar to the processing of steps S701 and S702 in FIG. 7.

After executing step S1002, processing proceeds to step S1003.

The processing in steps S1003 to S1009 is similar to the processing in steps S704 to S710 in FIG. 7.

In step S1003, search path stack 310 is referenced, and a determination is made whether the stack pointer points to the array element number of the root node in array 309.

If the pointer points to the array element number of a node other than the root node, processing proceeds to step S1004.

Then, in step S1004, after obtaining, from the search path stack 310, the array element number in array 309 pointed to by the pointer, the pointer is decremented by one.

That is to say, a pop operation takes place in step S1004.

In step S1005, from the array element number in array 309 obtained in step S1004, the node position within the pair is obtained for whichever of the nodes in the node pair which holds the node with that array element number.

Then in step S1006, a determination is made whether the node position obtained in step S1005 is the node [1] side.

If the determination in step S1006 is that the node is node [1] side, processing returns to step S1003 and the processing of steps S1003 to S1006 is repeated until the array element number pointed to by the pointer is either node [0] or the root node.

If the determination in step S1006 is that it is the node [0] side, processing proceeds to step S1007 and "1" is added to the array element number and the array element number in array 309 for the node [1] that is paired with the node [0] is obtained.

Then, in step S1008, array element number of the node [1] obtained in step S1007 is set as the array element number of the traverse start node and in step S1009 the processing of FIG. 10B is executed just as in step S1002, and only traversing nodes [0], the path is traversed from the traverse start node to a leaf node, and the nodes traversed are successively stored in the node backup array 401.

After that, processing returns to step S1003, and the same processing is repeated until a determination is made in step S1003 the stack pointer points to the array element number in array 309 of the root node.

Also, since the processing in step S1002 and step S1009 in FIG. 10A is the same, it is possible to show diagrammatically a return from step S1008 to step S1002.

Still, as a matter of convenience in later descriptions, since it is useful to refer to consecutive numbers from step S1003 to step S1009, FIG. 10A shows it that way.

Next, referencing FIG. 10B, the process of storing nodes in the node backup array 401 while traversing the nodes is described.

The processing in FIG. 10B is called out in step S1002 and S1009 of FIG. 10A.

Also, the processing in FIG. 10B is an applied illustration of the process of requesting the minimum value of the index keys explained by referencing FIG. 5.

First, in step S1011, the array element number of the traverse start node set in step S1001 or step S1008 of FIG. 10A is acquired.

This array element number is an array element number for array 309.

Next, in step S1012, the array element number acquired is stored in the search path stack 310, and in step S1013 the array element corresponding to that array element number is read out from array 309 as the node to be referenced.

Then in step S1014, the node read out is stored in the node backup array 401.

Also the elements of the node backup array 401 are filled in from the first of the elements successively without any empty places.

Continuing, in step S1015, the node type is obtained from the read-out node and in step S1016 a determination is made whether the node type is branch node.

If the determination in step S1016 is that the read-out node is a branch node, processing proceeds to step S1017 and the coupled node indicator is obtained from the node, and in step S1018 the value "0" is added to the obtained coupled node indicator and the result is used as a new array element number and processing returns to step S1012.

Afterwards, the processing from step S1012 to step S1018 is repeated until a determination is made in step S1016 that the node is a leaf node.

If the determination in step S1016 is that the node type is a leaf node, processing is terminated.

As it is clear that there are common points between the processing of FIG. 10B and the processing for requesting the minimum value of the index keys in FIG. 5, the processing of FIG. 10B is the process of traversing the path in the subtree with the traverse start node as its root node from the traverse start node until the leaf node containing the minimum index key.

Thus, successively, for the nodes on the path from the traverse start node until the leaf node, including the traverse start node and the leaf node which are both ends of the path, the array element numbers are stored in the search path stack 310, and the contents of those nodes are stored in the node backup array 401.

Just as the processing in FIG. 7, by which the index keys are obtained in ascending order, includes the same processing of FIG. 5, which searches for the minimum index key, so the processing in FIG. 10A, which backup the nodes in the node backup array 401, giving priority to the node [0] side of the node pairs and the tree depth direction, includes the processing of FIG. 10B, which traverses the nodes in the subtree with the traverse start node as its root node, from the traverse start node to the leaf node which includes the minimum index key.

Figure 11:
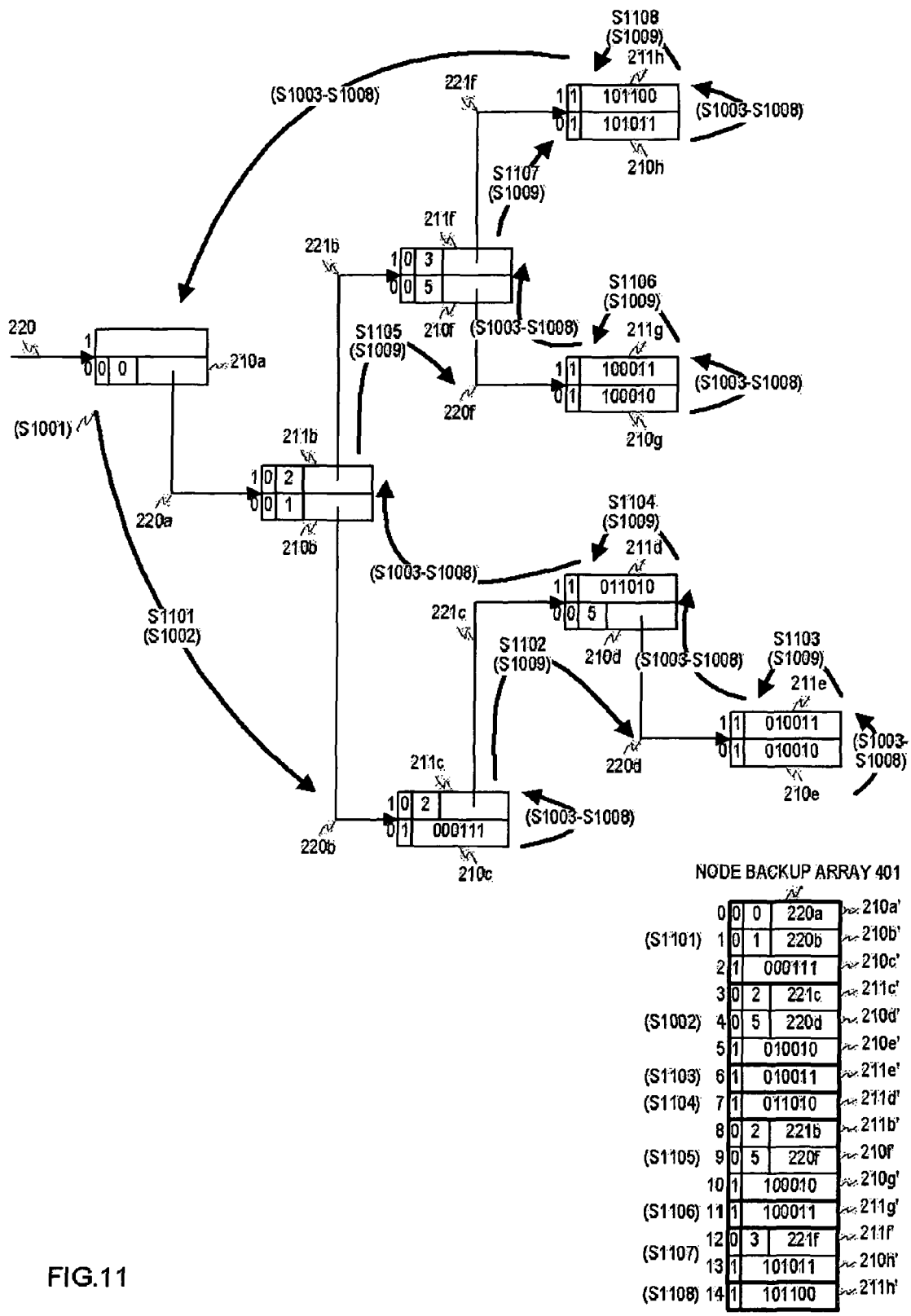
FIG. 11 is a drawing describing the backup processing using a coupled node tree
Figure 12:
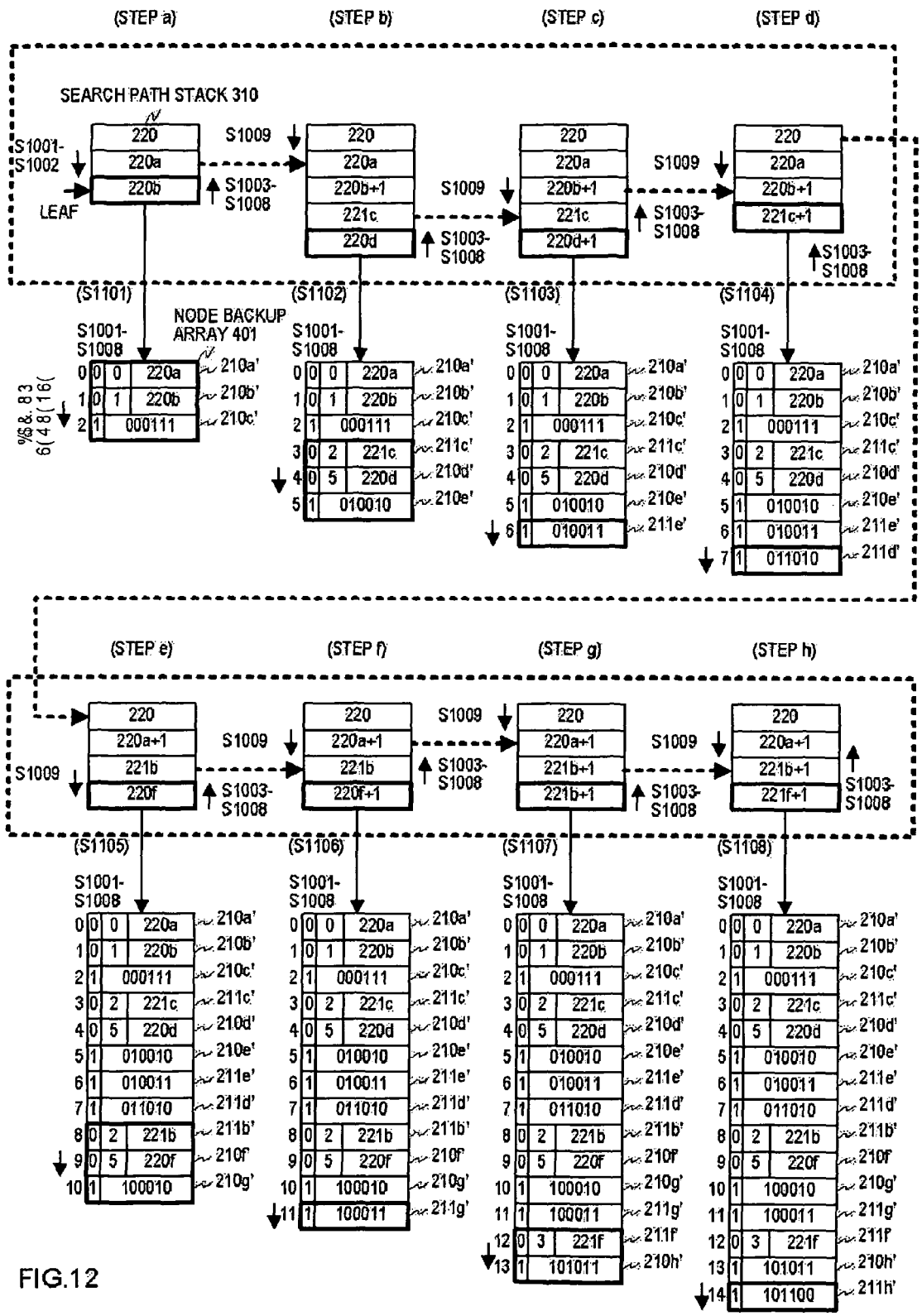
FIG. 12 is a drawing showing the status of the search path stack and the backup node array changed by the backup processing

FIG. 11 and FIG. 12 are drawings describing the backup processing related to this embodiment shown in the flowcharts of FIG. 10A and FIG. 10B using the example of backup the coupled node tree shown in FIG. 2B.

Below, referencing both FIG. 11 and FIG. 12, the flow of backup the coupled node tree of FIG. 2B, using the backup processing of FIG. 10A and FIG. 10B, is described.

FIG. 11 shows the arrow showing the process flow as well as the same coupled node tree as in FIG. 2B and also the final contents of node backup array 401.

FIG. 12 is a drawing showing the status of search path stack 310 at each stage in the processing of FIG. 11 and the contents backed up in node backup array 401.

Each of the array elements in node backup array 401 has been tagged with a code with an apostrophe suffixed to it corresponding to the code of the node backed up in that array element.

For example, the array element in which the contents of node 210a is backed up is tagged with the code 210a'.

Also, for the sake of convenience in the description, the array elements in node backup array 401 are referenced starting with the array element number 0. These array element numbers are shown on the left side of node backup array 401 in FIG. 11 and FIG. 12.

Also, the array element numbers of array 309 holding the search path stack 310 in FIG. 12 correspond to those of the coupled node tree shown in FIG. 11.

As the arrow in step S1101 of FIG. 11 shows, backup processing starts with traversing the path using root node 210a as the traverse start node, up to the leaf node 210c which holds the minimum index key under root node 210a.

This corresponds to steps S1001 and S1002 of FIG. 10A.

Consequently, as shown in FIG. 12 (a), as the effect of executing steps S1011 to S1018 in FIG. 10B, called out from step S1002, starting from array element number 220 of the root node 210, successively, array element numbers 220a and 220b are also stored in the search path stack 310 and the contents of the root node 210a, node 210b, and node 210c are backed up into the array elements with array element numbers 0, 1, and 2 respectively of the node backup array 401.

Continuing, steps S1003 to step S1008 are executed.

By this process, in step S1004, the array element number 220b is obtained from the search path stack 310, and since the node 210c of array element number 220b is a node [0], proceeding from step S1006 to step S1007, the array element number (220b+1) is obtained, and, in step S1008, this is specified in the array element number of the traverse start node.

Then as shown in step S1102 of FIG. 11, the path is traversed up to the leaf node 210e which holds the minimum index key under node 211c, using node 211c with the array element number (220b+1) as the traverse start node.

This corresponds to calling out and executing the processing of FIG. 10B from step S1009 of FIG. 10A.

Consequently, as shown in FIG. 12 (b), as the effect of executing steps S1011 to S1018 in FIG. 10B, starting from array element number 220 of the root node 210, array element numbers (220b+1), 221c and 220d are successively stored in the search path stack 310 and the contents of node 211c, node 210d, and node 210e are backed up into the array elements with array element numbers 3, 4, and 5 respectively of the node backup array 401.

Also, the array element numbers 0 to 2 of node backup array 401 in FIG. 12 (b), corresponding to the nodes backed up in step S1101, are enclosed in a thin line and the array element numbers 3 to 5 are enclosed in a thick line.

Even in the steps below, node backup array 401 is depicted in the same way.

Continuing, steps S1003 to step S1008 are executed.

By this process, in step S1004, the array element number 220d is obtained from the search path stack 310, and since the node 210e of array element number 220d is a node [0], proceeding from step S1006 to step S1007, the array element number (220d+1) is obtained, and, in step S1008, this is specified in the array element number of the traverse start node.

Then as shown in step S1003 of FIG. 11, the processing of FIG. 10B is called out from step S1009 of FIG. 10A and steps S1011 to S1016 are executed with node 211e with the array element number (220d+1) as the traverse start node.

Since node 211e is a leaf node, as FIG. 12 (c) shows, only the array element number (220d+1) is stored in search path stack 310, and only the contents of node 211e is backed up to node backup array 401 as the array element with array element number 6.

Continuing, steps S1003 to S1008 are executed in the following way.

That is to say, in step S1004, the array element number (220d+1) is obtained from the search path stack 310, and since node 211e with the array element number (220d+1) is a node [1], processing returns from step S1006 to step S1003.

Then the pop operation of step S1004 is again performed, and the array element number 221c is obtained from the search path stack 310.

Since the node 210d of array element number 221c is a node [0], proceeding from step S1006 to step S1007, the array element number (221c+1) is obtained, and, in step S1008, this is specified in the array element number of the traverse start node.

Then as shown in step S1104 of FIG. 11, the processing of FIG. 10B is called out from step S1009 of FIG. 10A and steps S1011 to S1016 are executed with node 211d with the array element number (221c+1) as the traverse start node.

Since node 211e is a leaf node, as FIG. 12 (d) shows, the result of this processing is that only the array element number (221c+1) is stored in search path stack 310, and only the contents of node 211d is backed up to node backup array 401 as the array element with array element number 7.

Continuing, steps S1003 to S1008 are executed in the following way.

That is to say, in step S1004, the array element number (221c+1) is obtained from the search path stack 310. Since node 211d with the array element number (221c+1) is a node [1], processing returns from step S1006 to step S1003, and the pop operation of step S1004 is again performed, and the array element number (220b+1) is obtained from the search path stack 310. Since node 211c with the array element number (220b+1) is also a node [1], processing returns from step S1006 to step S1003, and by the pop operation of step S1004, the array element number (220a) is obtained from the search path stack 310.

Since the node 210b of array element number 220a is a node [0], proceeding from step S1006 to step S1007, the array element number (220a+1) is obtained, and, in step S1008, this is specified in the array element number of the traverse start node.

Then as shown in step S1105 of FIG. 11, the processing of FIG. 10B is called out from step S1009 of FIG. 10A and steps S1011 to S1016 are executed with node 211b with the array element number (221a+1) as the traverse start node, and the path is traversed up to the leaf node 210g which holds the minimum index key under node 211b.

As a result, as shown in FIG. 12 (e), array element numbers (220a+1), 221b and 220f are successively stored in the search path stack 310 and the contents of node 211b, node 210f, and node 210g are backed up into the array elements with array element numbers 8, 9, and 19 respectively of the node backup array 401.

Continuing, steps S1003 to S1008 are executed.

By this process, in step S1004 the array element number 220f is obtained from search path stack 310, and since the node 210g with array element number 220f is a node [0], proceeding from step S1006 to step S1007, the array element number (220f+1) is obtained, and, in step S1008, this is specified in the array element number of the traverse start node.

Then as shown in step S1106 of FIG. 11, the processing of FIG. 10B is called out from step S1009 of FIG. 10A and steps S1011 to S1016 are executed with node 211b with the array element number (221a+1) as the traverse start node.

Since node 211g is a leaf node, as FIG. 12 (f) shows, the result of this processing is that only the array element number (220f+1) is stored in search path stack 310, and only the contents of node 211g is backed up to node backup array 401 as the array element with array element number 11.

Continuing, steps S1003 to S1008 are executed in the following way.

That is to say, in step S1004, the array element number (220f+1) is obtained from the search path stack 310. Since node 211g with the array element number (220f+1) is a node [1], processing returns from step S1006 to step S1003.

Then in step S1004 the array element number 221b is obtained from the search path stack 310.

Since the node 210f of array element number 221b is a node [0], proceeding from step S1006 to step S1007, the array element number (221b+1) is obtained, and, in step S1008, this is specified in the array element number of the traverse start node.

Then as shown in step S1106 of FIG. 11, the processing of FIG. 10B is called out from step S1009 of FIG. 10A and steps S1011 to S1016 are executed with node 211f with the array element number (221b+1) as the traverse start node, and the path is traversed up to the leaf node 210h which holds the minimum index key under node 211f.

As a result, as shown in FIG. 12 (g), array element numbers (221b+1) and 221f are successively stored in the search path stack 310 and the contents of node 211f and node 210h are backed up into the array elements with array element numbers 12 and 13 respectively of the node backup array 401.

Continuing, steps S1003 to S1008 are executed.

By this process, in step S1004 the array element number 221*f* is obtained from search path stack 310, and since the node 210*h* with array element number 221*f* is a node [0], proceeding from step S1006 to step S1007, the array element number (221*f*+1) is obtained, and, in step S1008, this is specified in the array element number of the traverse start node.

Then, as shown step S1108 of FIG. 11, the processing of FIG. 10B is called out from step S1009 of FIG. 10A and steps S1011 to S1016 are executed with node 211*h* with the array element number (221*f*+1) as the traverse start node.

Since node 211*h* is a leaf node, as FIG. 12 (*h*) shows, the result of this processing is that only the array element number (221*f*+1) is stored in search path stack 310, and only the contents of node 211*h* is backed up to node backup array 401 as the array element with array element number 14.

After that, steps S1003 to S1008 are executed in the following way.

That is to say, in step S1004, the array element number (221*f*+1) is obtained from the search path stack 310, and since node 211*h* with the array element number (221*f*+1) is a node [1], processing returns from step S1006 to step S1003.

Then the array element number (220*b*+1) is obtained from the search path stack 310 in step S1004, and since node 211*f* with the array element number (221*b*+1) is a node [1], processing returns from step S1006 to step S1003.

Next the array element number (220*a*+1) is obtained in step S1004, and since node 211*b* with the array element number (221*a*+1) is a node [1], processing returns from step S1006 to step S1003, and here, since the stack pointer points to the array element number 220 of the root node 210*a*, backup processing is terminated.

By means of the above processing, all the nodes configuring the coupled node tree shown in FIG. 11 can be backed up.

Also it is clear that if the arrow showing the processing sequence and the node backup array 401 in FIG. 11 are compared, the sequence whereby the nodes are backed up is the search sequence wherein priority is given to the depth side and to the node [0] side of the coupled node tree.

Also, as is well known, if the nodes of a tree structure are disposed in a search sequence wherein priority is given to the depth side, the nodes configuring any arbitrary subtree will be disposed in a consecutive order.

For example, the subtree with node 211*c* as its root node has been backed up in a consecutive area with array element numbers 3 to 7.

Figure 13:
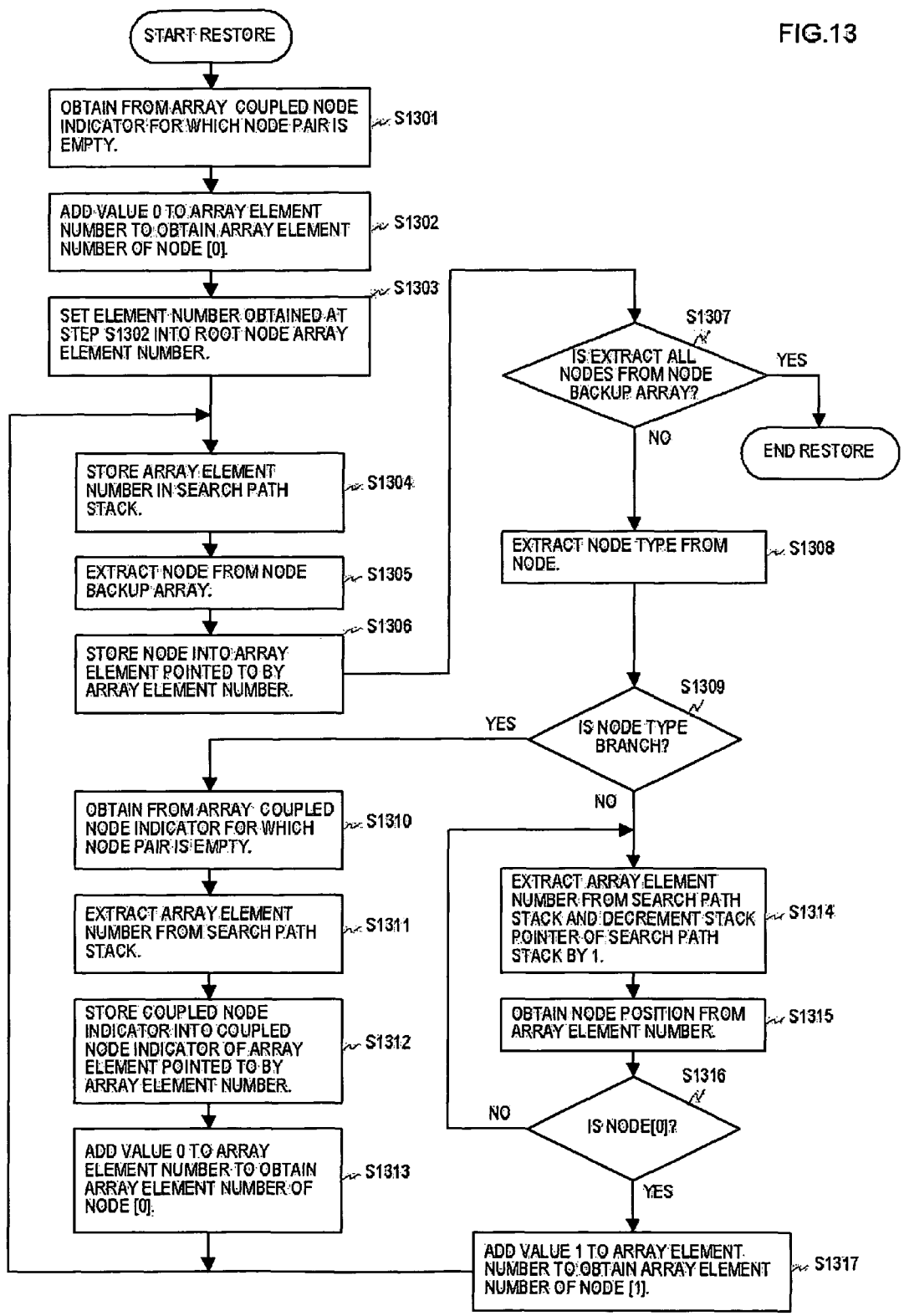
FIG. 13 is a flowchart showing the restore processing in a preferred embodiment of this invention

FIG. 13 is a flowchart showing the restore processing to restore a coupled node tree from the node backup array 401 obtained by the backup processing described above, and is the flowchart for case wherein the coupled node tree, after restoration, is stored in an array.

The array for storing the coupled node tree after restoration is, for example, an array like the array 309 in FIG. 3.

Herein below, the array to hold the coupled node tree after restoration is referenced with the code 309', but array 309' itself is not depicted.

Depending on the embodiment, Array 309 and Array 309' can be the same array, or different arrays in the same storage device, or different arrays in different storage devices.

Also, in the description of restore processing below, the explanation uses search path stack 310, but naturally the restore processing can be done using a search path stack other than the search path stack 310 used in searching and the like in the original coupled node tree.

In FIG. 13, first, in step S1301, the coupled node indicator for an empty node pair is obtained from Array 309' for storing the nodes of the coupled node tree that is to be restored, and, in step S1302, the value "0" is added to that coupled node indicator, and the array element number of node [0] of the node pair is obtained.

Then in step S1303, the array element number obtained in step S1302 is registered as the array element number of the root node.

By the processing of steps S1301 to S1303, the area for the root node of the coupled node tree that is to be restored is secured, and the root node is registered.

Continuing, in step S1304, an array element number is stored in the search path stack 310.

As shown in FIG. 13, step S1304 is executed immediately after steps S1303, S1313, and S1317.

The array element number stored in search path stack 310 in step S1304 is the array element number for array 309' obtained in step S1302 if the step immediately preceding step S1304 is step S1303, and is the array element number for array 309' obtained in step S1313 if step S1313 is the immediately preceding step, and is the array element number for array 309' obtained in step S1317 if step S1317 is the immediately preceding step.

Next in step S1305 the contents of the first node of the unprocessed nodes in node backup array 401 is extracted, and in step S1306 the contents of the node extracted in step S1305 is written into the array element of array 309' pointed to by array element number stored in search path stack 310 in step S1304.

The processing from step S1304 to step S1306 restores one node.

To be more precise, leaf nodes are completely restored by the processing from step S1304 to step S1306 and information other than the coupled node indicator of the link target to be restored (node type and discrimination bit position) are restored for branch nodes in the subsequent steps S1310 to S1312.

Next, proceeding to step S1307, a determination is made whether all nodes have been extracted from node backup array 401. If all nodes have been extracted, restore processing terminates, and if unprocessed nodes remain in node backup array 401, processing proceeds to step S1308.

In step S1308, the node type is extracted from the node extracted in step S1305, and, in step S1309, a determination is made whether the node type (the type of the node restored in step S1306) is a branch node. If the node type is a branch node, processing proceeds to step S1310 and, if a leaf node, to step S1314.

In step S1310, just as in step S1301, a coupled node indicator for an empty node pair is obtained from array 309'.

Then, in step S1311, an array element number, pointed to by the stack pointer, is extracted from the search path stack 310.

In addition, a pop operation is not performed in the processing of step S1311, and the stack pointer is unchanged.

Continuing, in step S1312, coupled node indicator obtained in step S1310 is written into the coupled node indicator of the array element in array 309' with the array element number extracted in step S1311.

By this process, the branch nodes that were partially restored in step S1306 now have the status of being completely restored.

Then in step S1313, the array element number in array 309' corresponding to the node next to be restored is obtained.

That is to say, the value "0" is added to the coupled node indicator obtained in step S1310 and thereby the array element number of the node [0] in array 309' is obtained.

After executing step S1313, processing returns to step S1304.

If, in step S1309, a determination is made of a leaf node, in step S1314, the array element number of an array element in array 309' pointed to by the stack pointer is extracted from search path stack 310 and the stack pointer is decremented by 1.

Continuing, in step S1315, the node position of whichever of the two nodes in the node pair the array element is stored can be obtained from the array element number extracted in step S1314.

Then, in step S1316, a determination is made whether the node position obtained in step S1315 is the node [0] side. If in step S1316 the determination is that it is the node [1] side, processing returns to step S1314, and steps S1314 to S1316 are repeated until the node with the array element number pointed to by the stack pointer is a node [0].

When the determination is step S1316 is that the node is on the node [0] side, processing proceeds to step S1317, and a "1" is added to the array element number obtained in step S1314, and the array element number of node [1] of that node pair is obtained. Then processing proceeds to step S1304.

Steps S1314 to S1316 are steps to trace back in search path stack 310 in order to determine the next node to be restored after a leaf node has been restored. In this way, the same processing is repeated until a determination is made in step S1307 that all the nodes have been extracted from node backup array 401.

That is to say, the processing in FIG. 13 is a repetition of restore one by one the nodes included in node backup array 401 in sequence from the first.

Thus the restoration of one node is performed by deciding the array element number in array 309' which is to be the restore target position, the position wherein that node is to be restored, and storing that array element number in search path stack 310, and reading out the contents of the node which is the first unprocessed node in node backup array 401, and writing the contents of the read-out node into the array element pointed to by that array element number.

Figure 14:
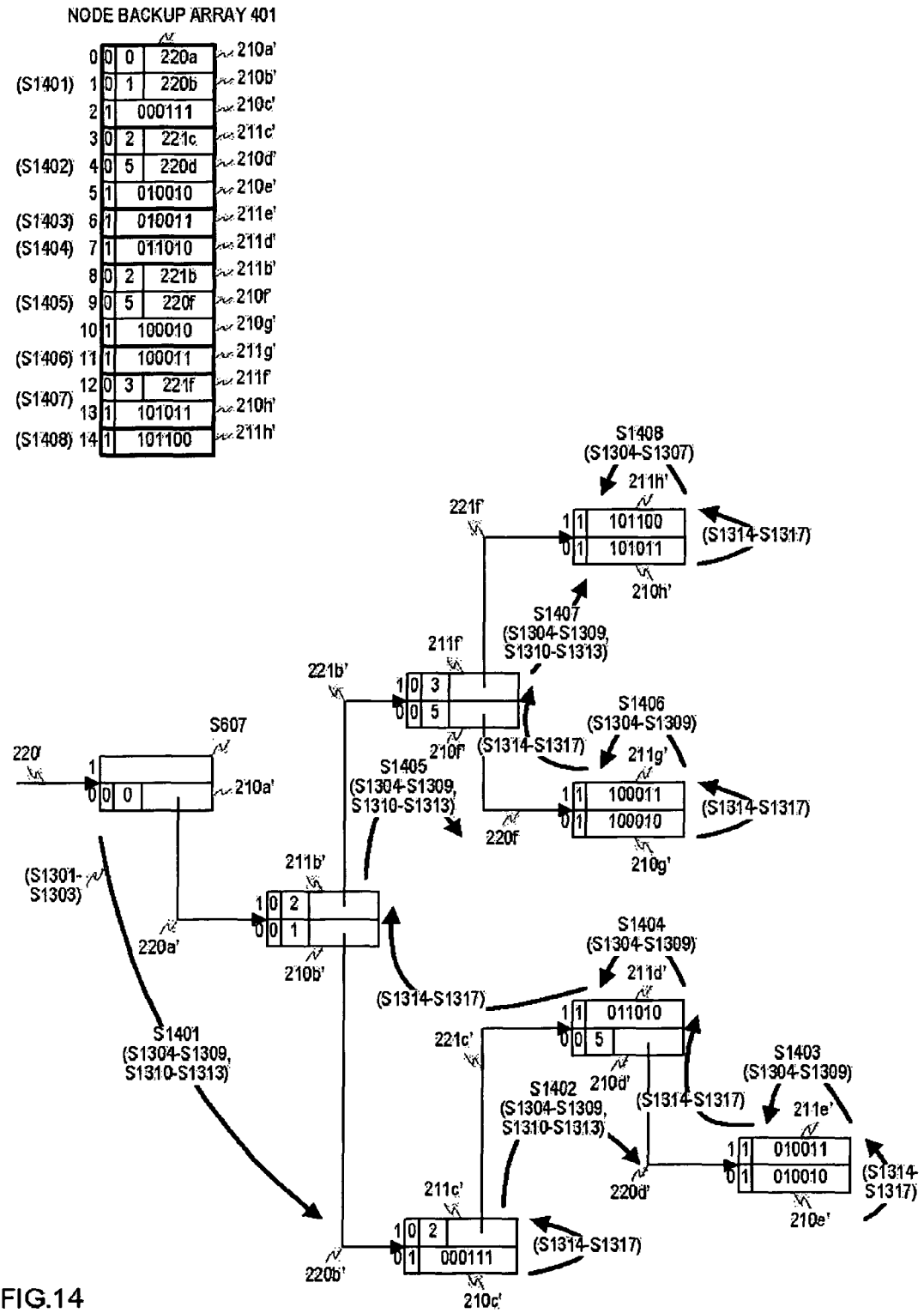
FIG. 14 is a drawing describing the restore processing using a coupled node tree

FIG. 14 and FIG. 15 are drawings describing the restore processing related to the embodiment shown in the flowchart of FIG. 13, using the example of restore the original coupled node tree in FIG. 2B into the unshown array 309' from the node backup array 401 of FIG. 11 and FIG. 12.

Hereinafter, the flow restore the coupled node tree of FIG. 2B into array 309' by the restore processing of FIG. 13 is described, referencing both FIG. 14 and FIG. 15.

FIG. 14 shows the arrow depicting the flow of processing and the configuration of the coupled node tree after restoration and shows the contents of node backup array 401.

The node backup array 401 in FIG. 14 is the same as that shown in FIG. 11 except for the step numbers shown on the left side.

The coupled node tree after restoration shown in FIG. 14 has the same configuration as the original coupled node tree illustrated in FIG. 2B and FIG. 11, and the values of the index keys included in each leaf node is the same as those in FIG. 2B and FIG. 11.

However, the values of the array element numbers of the nodes are generally different between the original coupled node tree and the coupled node tree after restoration.

Whereat, in FIG. 14, a code suffixed with an apostrophe is used for the code indicating the original node and the coupled node indicator.

For example the node that restores the original node 210b is assigned the code 210b'.

Also the array element number of the original node 210b in array 309 and the array element number of the restored node 210b' in array 309' may have different values, but since they are mutually associated they have the associated codes 220a and 220a'.

In addition, the array element numbers for array 309' stored in the search path stack 310 of FIG. 15 is associated to those of the coupled node tree shown in FIG. 14.

FIG. 15 is a drawing that shows the status of search path stack 310 at each stage of the processing in FIG. 14 as well as emphasizing the parts in node backup array 401 that are processed at each such stage.

As the arrow in step S1401 of FIG. 14 shows, restore processing starts with the restoration of root node 210a' by the processing of steps S1301 to S1303 in FIG. 13.

That is to say, the coupled node indicator 220' of an empty node pair in array 309' is obtained and array element number which derived from (220'+0)=220' is obtained, and this array element number is registered as the array element number of root node 210a'.

However, at this point the value of the coupled node indicator of root node 210a' is undetermined and the restoration of root node 210a' is incomplete.

Continuing, the processing sequence from step S1304 through steps S1309 and S1310 to step S1313 is repeated as long as the determination in step S1309 is that of a branch node.

That is to say, in step S1304, the array element number 220' is pushed into search path stack 310, and in step S1305 the node with array element number 0 is extracted from node backup array 401.

This node is the root node, as was described in FIG. 11 and FIG. 12.

In step S1306, the contents of the node extracted in step S1305 in written into the array element with the array element number 220' in array 309'.

This produces the status wherein the node type of root node 210a' indicates a branch node but 0 is stored in the discrimination bit position and the array element number for 220a acquired from node backup array 401 is stored in the coupled node indicator.

Continuing, the steps from S1307 to S1309 are executed, and since the root node 210a' is a branch node, processing proceeds to step S1310, and the coupled node indicator 220a' of an empty node pair in array 309' is acquired.

Then, in step S1311, the array element number 220' is acquired from the search path stack 310 and, in step S1312, the coupled node indicator 220a' acquired in step S1310 is written in the coupled node indicator of root node 210a' pointed to by array element number 220'.

The result is that the restoration of root node 210a' is completed and the status of root node 210a' is that shown in FIG. 14.

In the next step S1313, the array element number derived from (220a'+0)=220a' is acquired and, in the following step S1304, this is pushed into the search path stack 310.

Then, in step S1305, the node with array element number 1 in the node backup array 401 is extracted and, in step S1306, the contents of the acquired node, comprising the node type 0, the discrimination bit position 1, and the coupled node indicator 220b, are written into the array element with the array element number 220a' in array 309'.

After node 210b' is restored by executing steps S1307 to S1312 just as described above, processing returns from step S1313 to step S1304 and the array element number 220b' is pushed into the search path stack 310.

Then, in step S1305, the node with array element number 2 is extracted from node backup array 401.

In step S1306, the node type 1, indicating a leaf node, and the index key "000111" are stored in the array element with the array element number 220b' in array 309' and node 210c' is restored exactly as in FIG. 14.

Continuing, the steps S1307 to S1309 are executed, and node 210c' is determined to be a leaf node.

FIG. 15(a) shows this stage, that is to say, the status of the search path stack 310 when step S1401 in FIG. 14 is executed.

Also since three nodes associated with the array element numbers 0 to 2 in the node backup array 401 have been restored up to this stage, the array element in node backup array 401 corresponding to these 3 nodes are enclosed in thick lines in FIG. 15 (a), and since the array elements with the array element numbers 0 to 2 have been restored, an explanation of the subsequent parts (b) to (h) of FIG. 15 is omitted.

Continuing, steps S1314 to S1317 are executed.

By this processing, in step 1314, the array element number 220b' is popped from the search path stack 310 and, since the node 210c' with array element number 220b' is a node [0], processing proceeds from step S1316 to step S1317 and the array element number (220b'+1) is obtained.

Then, as shown in step S1402 of FIG. 14, the processing sequence from step S1304 through steps S1309 and S1310 to step S1313 is repeated as long as the determination in step S1309 is that of a branch node.

By this process, nodes 211c', 210d' and 210e' are restored, as explained below.

In step S1304, which is the first step configuring step S1402, the array element number (220b'+1) is pushed into the search path stack 310.

In step S1305, the node with array element number 3 in the node backup array 401 is extracted, and node 211c' is restored by the processing from step S1309 to step S1312 just as was explained above.

Then processing returns from step S1313 to step S1304 and the array element number 221c' is pushed into the search path stack 310.

Continuing, in step S1305, the node with array element number 4 in the node backup array 401 is extracted and, as was explained above, the node 210d' is restored by steps S1306 to S1312.

Then, returning from step S1313 to step S1304, the array element number 221d' is pushed into the search path stack 310.

Then, the node with array element number 5 in the node backup array 401 is extracted and in step S1306 the contents of this node are written into the array element of array 309' with the array element number 220d', and node 210e' is restored.

Continuing, steps S1307 to S1309 are executed, and node 210e' is determined to be a leaf node.

FIG. 15 (b) shows this stage, that is to say, it shows the status of search path stack 310 at the stage after step S1402 has been executed.

Also, since in the process from the status of FIG. 15 (g) to the status of FIG. 15 (h), three nodes associated with the array element numbers 3 to 5 in the node backup array 401 have been restored, the array elements in the node backup array 401 corresponding to these 3 nodes are enclosed in thick lines.

Continuing, steps S1314 to S1317 are executed.

By this processing, in step 1314, the array element number 220d' is popped from the search path stack 310 and, since the node 210e' with array element number 220d' is a node [0], processing proceeds from step S1316 to step S1317 and the array element number (220d'+1) is obtained.

Then, as shown in step S1403 of FIG. 14, steps S1304 to S1309 are executed. That is to say, in step S1304 the array element number (220d'+1) is pushed into the search path stack 310 and in step S1305 the node with array element number 6 is extracted from node backup array 401 and in step S1306 the node 211e' is restored.

After that, in step S1309, node 211e' is determined to be a leaf node.

FIG. 15 (c) shows this stage, that is to say, it shows the status of search path stack 310 at the stage after step S1403 has been executed.

Also, in the process from the status of FIG. 15 (b) to the status of FIG. 15 (c), the node corresponding to the array element number 6 in the node backup array 401 has been restored.

Continuing, steps S1314 to S1317 are executed in the following way.

First, in step 1314, the array element number (220d'+1) is popped from the search path stack 310.

Since the node 211e' for array element number (220d'+1) is a node [1], return is made to step S1314 from step S1316, and array element number (221c') is popped from the search path stack 310.

Since the node 210d' for array element number (221c') is a node [0], processing proceeds from step 1316 to step S1317, and array element number (221c'+1) is obtained.

Next, as shown in step S1404 of FIG. 14, steps S1304 to S1309 are executed.

By this process, in step S1304, array element number (221c'+1) is pushed into search path stack 310, and, in step S1305, the node with array element number 7 is extracted from node backup array 401, and, in step S1306, node 211d' is restored.

After that, in step S1309, a determination is made that node 211d' is a leaf node.

FIG. 15 (d) shows this stage, that is to say, shows the status of search path stack 310 at the stage after step S1404 has been executed.

Also, in the process from the status of FIG. 15 (c) to the status of FIG. 15 (d) the node corresponding to the array element number 7 in the node backup array 401 is restored.

Continuing, steps S1314 to S1317 are executed.

That is to say, after steps S1314 to S1317 are repeated until the node 210b' with array element number 220a' that is a node [0] is obtained, step S1317 is executed.

In this process, array element numbers (221c'+1), (220b'+1), and 220a' are sequentially popped from search path stack 310.

After that, in step S1317, array element number (220a'+1) is obtained.

Next, as shown in step S1405 of FIG. 14, the processing sequence for step S1304 through step S1309 and S1310 to step S1313 is repeated as long as the determination in step S1309 is that of a branch node.

This process restores nodes 211b', d10f', and 210g' as described below.

In step S1304, which is the first step configuring step S1405, the array element number (220a'+1) is pushed into search path stack 310.

In step S1305, the node for array element number 8 in node backup array 401 is extracted and, in step S1306, those contents are written into the array element with array element number (220a'+1) in array 309'.

Then steps S1307 to S1309 are executed and since the contents written are those of a branch node, processing proceeds to step S1310 and an empty node pair with the coupled node indicator 221b' is acquired from array 309'.

Then in step S1311 the array element number (220a'+1) is acquired from search path stack 310 and in step S1312 the coupled node indicator 221b' acquired in step S1310 is written into the coupled node indicator of node 211b' with array element number (220a'+1).

As a result, the restore of node 211b' is completed and node 211b' arrives at the status shown in FIG. 14.

In the next step, step S1313, the array element number computed from (221b'+0)=221b' is acquired and, in step S1304, is pushed into search path stack 310.

Then in step S1305 the node with array element number 9 in node backup array 401 is extracted and, in step S1306, those contents are written into the array element with array element number (221b') in array 309'.

Next steps S1307 to S1309 are executed and since the contents written are those of a branch node, processing proceeds to step S1310 and an empty node pair with the coupled node indicator 220f is acquired from array 309'.

Then in step S1311 the array element number (221b') is acquired from search path stack 310 and, in step S1312, the coupled node indicator 220f acquired in step S1310 is written into the coupled node indicator of node 210f with array element number (221b').

As a result, the restore of node 210f is completed and node 210f arrives at the status shown in FIG. 14.

In the next step S1313 the array element number computed from (220f+0)=220f is acquired and, in step S1304, is pushed into search path stack 310.

Then in step S1305 the node with array element number 9 in node backup array 401 is extracted and, in step S1306, those contents are written into the array element with array element number (220f) in array 309' and node 210g' is restored.

After that, steps S1307 to S1309 are executed and a determination is made that node 210g' is a leaf node.

FIG. 15 (e) shows this stage, that is to say, search path stack 310 at the stage wherein step S1405 has been executed.

Also, in the process from the status of FIG. 15 (d) to that of FIG. 15 (e), the three nodes corresponding to array element numbers 8 to 10 in node backup array 401 are restored.

Continuing, steps S1314 to S1317 are executed.

That is to say, in step 1314, the array element number (220f) is popped from the search path stack 310 and since the node 210g' for array element number (220f) is a node [0], processing proceeds from step 1316 to step S1317, and array element number (221f+1) is obtained.

Next, as shown in step S1406 of FIG. 14, steps S1304 to S1309 are executed.

By this process, in step S1304, array element number (220f+1) is pushed into search path stack 310, and, in step S1305, the node with array element number 11 is extracted from node backup array 401, and, in step S1306, node 211g' is restored.

After that, in step S1309, a determination is made that node 211g' is a leaf node.

FIG. 15 (f) shows this stage, that is to say, shows the status of search path stack 310 at the stage after step S1404 has been executed.

Also, in the process from the status of FIG. 15 (e) to the status of FIG. 15 (f) the node corresponding to the array element number 11 in the node backup array 401 is restored.

Continuing, steps S1314 to S1317 are executed in the following way.

First, in step 1314, the array element number (220f+1) is popped from the search path stack 310.

Since the node 211g' for array element number (220f+1) is a node [1], return is made to step S1314 from step S1316, and array element number (221b') is popped from the search path stack 310.

Since the node 210f for array element number (221b') is a node [0], processing proceeds from step 1316 to step S1317, and array element number (221b'+1) is obtained.

Next, as shown in step S1405 of FIG. 14, the processing sequence for step S1304 through step S1309 and S1310 to step S1313 is repeated as long as the determination in step S1309 is that of a branch node.

This process restores nodes 211f and 210h' as described below.

In step S1304, which is the first step configuring step S1405, the array element number (220b'+1) is pushed into search path stack 310.

In step S1305, the node for array element number 12 in node backup array 401 is extracted and, in step S1306, those contents are written into the array element with array element number (220b'+1) in array 309'.

Then steps S1307 to S1309 are executed and since the contents written are those of a branch node, processing proceeds to step S1310 and an empty node pair with the coupled node indicator 221f is acquired from array 309'.

Then in step S1311 the array element number (221b'+1) is acquired from search path stack 310 and in step S1312 the coupled node indicator 221f acquired in step S1310 is written into the coupled node indicator of node 211f with array element number (221b'+1).

As a result, the restore of node 211f is completed and node 211f arrives at the status shown in FIG. 14.

In the next step S1313, the array element number derived from (220a'+0)=220a' is acquired and, in step S1304, this is pushed into the search path stack 310.

In step S1305 the node with array element number 13 is extracted from node backup array 401 and in step S1306 the node 210h' is restored.

After that, in step S1309, node 210h' is determined to be a leaf node.

FIG. 15 (g) shows this stage, that is to say, shows search path stack 310 the stage wherein step S1407 has been executed.

Also, in the process from the status of FIG. 15 (f) to the status of FIG. 15 (g), the two nodes corresponding to array element numbers 12 and 13 in node backup array 401 are restored.

Continuing, steps S1314 to S1317 are executed.

That is to say, in step S1314, the array element number 221f is popped from the search path stack 310 and since the node 210h' of array element number 221f is a node [0], processing proceeds from step S1316 to step S1317 and the array element number (221f+1) is obtained.

Next, as shown in step S1408 of FIG. 14, steps S1304 to S1307 are executed and restore processing is completed.

That is to say, in step S1304, the array element number (221f+1) is pushed into search path stack 310, and in step S1305, the node with the array element number 14 in the node backup array 401 is extracted, and in step S1306, the node 211h' is restored.

Then, in step S1307, a determination is made that all the nodes have been extracted from node backup array 401 and restore processing is terminated.

FIG. 15 (h) shows this stage, that is to say, the search path stack 310 at the stage wherein step S1408 is executed.

Also, in the process from the status of FIG. 15 (g) to the status of FIG. 15 (h), the node corresponding to array element number 14 in the node backup array 401 is restored.

FIG. 15 shows 8 stages for (a) to (h), but as explained above, each of those 8 stages corresponds to a series of steps which restore 0 or more branch nodes and then restore a single leaf node.

The fact that restore processing consists of the repetition of this kind of a series of steps is a consequence of backup the nodes in a depth-prioritized search sequence.

It is merely a matter of restore the nodes, in the exact sequence wherein they were backed up, from backup array 401 wherein the nodes were backed up in depth-prioritized search sequence.

That is to say, a coupled node tree can easily be restored by repeating the process of reading out sequentially the array elements from node backup array 401 and while the nodes continue to be branch nodes, successively restore the child nodes as well as allocating a storage area for the node that is a pair with the child node to be restored and, if a leaf node is read out, searching for a storage area that was allocated but not restored, by tracing back up the tree structure toward the root node, and deciding that the node found thereby is to be the node that should next be restored.

As was explained above, restore processing uses search path stack 310 but there is no need to make decisions based on the index keys included in nodes or the discrimination bit position.

The point that a coupled node tree can be simply and efficiently restored in this way is an advantage of the restore method according to this invention.

As was described above, the configuration of a coupled node tree is uniquely prescribed by a set of index keys.

Consequently, if only the set of index keys are backed up, the coupled node tree itself can be restored.

But the method of restore a coupled node tree only from the index keys requires processing such as finding the discrimination bit position.

In contrast, the restore method of this invention does not require decisions based on index keys or discrimination bit positions and for that reason the processing finishes in a short time.

Also, since the restore method according to this invention merely restores the nodes in the sequence wherein they were backed up in the backup information, if the backup information is transferred over a network and the destination computer receives the coupled node tree and restores it, the result will be a time reduction.

The reason is that the transfer reception and restore can be done concurrently because, before the reception is completed, the nodes can be restored sequentially from the parts already received.

The above was a detailed description of the preferred embodiment to implement this invention, but the embodiments to implement this invention are not limited to that embodiment and various other embodiments are possible.

The above flowchart is a single example of the processing and it is clear that steps exist whereby the processing sequence could be interchanged or processed in parallel.

For example, it is permissible to move step S1304 of FIG. 13 to immediately after step S1305 or step S1306, and the processing of steps S1305 and S1306 could be done in parallel.

In the above example, the node [0] which is linked to in correspondence with a bit value of 0 is taken as the primary node and the node [1] which is linked to in correspondence with a bit value of 1 is taken as the non-primary node. However, it is permissible to take node [1] as the primary node and node [0] as the non-primary node.

Also, for example, if node [0] is the primary node and node [1] is the non-primary node in the original coupled node tree, it is permissible to have either node [0] as the primary node and node [1] as the non-primary node, or node [1] as the primary node and node [0] as the non-primary node, in the restored coupled node tree.

Also from the explanation related to FIG. 2, etc., it is clear that the root node can be freely disposed at either the position of the primary node or that of the non-primary node Also, in the above example, it is naturally possible either to backup and restore nodes in a depth-prioritized search sequence which gives priority to the bit value 0 or to backup and restore nodes in a depth-prioritized search sequence which gives priority to the bit value 1.

A depth-prioritized search sequence which gives priority to the bit value 0 is the same processing sequence as FIG. 7, wherein the index keys stored in a coupled node tree are extracted in ascending sequence.

Consequently, the above illustrative embodiment is shown in the flowchart of FIG. 10A, which is similar to FIG. 7, and the processing of FIG. 10B called out from FIG. 10A is similar to the processing for obtaining a minimum value of FIG. 5 called out from FIG. 7.

In the same way, a depth-prioritized search sequence which gives priority to the bit value 1 is the same processing sequence as FIG. 8, wherein the index keys stored in a coupled node tree are extracted in descending sequence.

Consequently, in this case, in order to traverse nodes in the same processing sequence as shown in FIG. 8 and FIG. 6, it is sufficient to modify the processing of FIG. 10A and FIG. 10B respectively.

Also, in line with that, it is sufficient to change the processing of FIG. 13.

Just as in the above illustrative embodiment, when describing the process based on the assumption that node [0] is the primary node, it is necessary to make the following concrete changes.

First, step S1006 of FIG. 10A should be made to proceed to step S1007 for a node [1].

Step S1007 is changed so that the array element number is decremented by 1 and the array element number of node [0] is obtained, and step S1008 is changed so that the array element number of node [0] is set as the array element number of the traverse start node.

Then step S1018 of FIG. 10B is changed so that the value 1 is added rather than the value 0.

In that way, to restore a coupled node tree backed up with a depth-prioritized search sequence which gives priority to the bit value 1, FIG. 13 should be changed in the following way.

First step S1313 should be changed so that the value 1 is added to the coupled node indicator and the array element number of node [1] obtained, and step S1316 changed so that processing proceeds to step S1317 for a node [1], and step S1317 changed so that the array element number is decremented by 1 and the array element number of node [0] is obtained.

In other words, the above illustrative changes can be summarized in the following way.

When traversing while giving priority to the primary node side in backup processing, when node [0] is the primary node, the coupled node tree is backed up in the ascending sequence of index keys just as in FIG. 10A, and when node [1] is the primary node, it is backed up in the descending sequence of index keys.

Conversely, when traversing while giving priority to the non-primary node side in backup processing, when node [0] is the primary node, the coupled node tree is backed up in the descending sequence of index keys, and when node [1] is the primary node, it is backed up in the ascending sequence of index keys.

Restore processing is appropriately transformed in compliance with the illustrative embodiment based on whether either of node [0] or node [1] are the primary node and whether backup processing was done in either ascending sequence or descending sequence of index keys.

In the example of the process from FIG. 10A to FIG. 15, for the sake of convenience in the description, the description used an example wherein the backup information was stored in node backup array 401 since it is useful to express the sort sequence in the backup information of the contents of backed up nodes.

However, it is sufficient that the node information be information ordered in the sequence the nodes were backed up, and it not necessary that the backup information be in an array like node backup array 401.

Depending on the kind of illustrative embodiment, the backup information can also be stored in a file in external storage device 306, or it can be stored an array like node backup array 401 or in some other format in main storage device 305, or it can be transferred to another computer via communication apparatus 307 and a network.

For the sake of convenience in the description in the above illustrative embodiment, expressions such as storing nodes in node backup array 401 or backup nodes in node backup array 401 were used but this is not intended to disallow embodiments wherein the contents of nodes are backed up by means of transmitting the contents of the nodes via a network.

Also, the coupled node indicator included in a branch node is backed up in the above backup processing, but it need not be backed up.

The reason is that, in the restore process, the coupled node indicator is acquired as the array element number of the primary node of an empty node pair in array 309' wherein the coupled node tree is to be stored after it is restored, without regard to the array element numbers of array 309 used in the original coupled node tree.

That is to say, since the coupled node indicator included in the original branch node before the backup is not used at all after the restore, it need not be backed up.

If the coupled node indicator of a branch node is not backed up, the amount of data in the backup information can be reduced by that amount.

That is to say, if the backup information is backed up in a file the size of the file is reduced and if the backup information is transferred via a network the network traffic is also reduced.

Also, the restore processing of FIG. 13 has the advantage that a coupled node tree backup in one environment can easily be restored in another environment because the array element numbers of array 309' are used without regard to the array element numbers of the original array 309.

Also, FIG. 10A showed the processing wherein all of an existing coupled node tree, but it is also possible to backup only a subtree.

For that reason, the root node in steps S1001 and S1003 of FIG. 10A need not be the root node of the whole coupled node tree but rather can be the root node of a subtree that should be backed up.

If the restore processing of FIG. 13 is executed using a backup node array obtained in this fashion, the backup subtree will be restored.

Also, FIG. 13 shows the processing wherein a coupled node tree is restored with all the nodes backed up in node backup array 401, but it is also possible, by means of a change to part of the processing of FIG. 13, to restore only a subtree of those nodes.

As stated above, for any subtree in node backup array 401, all the nodes configuring that subtree are backed up in array elements with consecutive array element numbers.

If a specification is made beforehand as to which position in node backup array 401 is the root node of a subtree to be restored, it is possible to restore only the contents of that subtree of the backup coupled node tree by reading out the contents of node backup array 401 using that position as the starting position for the read-out.

However, step S1318 was added between steps S1003 and S1004 of FIG. 13 and step S1319 between steps S1015 and S1016 for that reason.

In the added step S1318, a specification made as to which position in node backup array 401 is the root node of the subtree to be restored, and any contents before that position in node backup array 401 is skipped.

Also, in the added step S1319, a determination is made whether the stack pointer points to the array element number of the root node.

Then if the stack pointer points to the array element number of the root node, restore processing finishes; and, if not, processing proceeds to step S1316.

Also, the word "root node" used in step S1303 and the added step S1319 signifies not the root node of the whole tree that was the source of the backup operation but rather the root node of the subtree that was the object of the restore operation.

By this kind of partial change in the processing, it is possible, for example, to restore from the node backup array 401 the subtree with the root node 211c' by specifying the node with array element number 3 in the node backup array 401 of FIG. 14 as the root node of the subtree to be restored, and using only the part of the node backup array 401 with the array positions numbers 3 to 7.

As shown above, in accordance with a preferred embodiment of this invention, even backup only a subtree and restore only a necessary subtree from the node backup array can be easily and efficiently be enabled.

Thus, in accordance with this preferred embodiment, even if the size of the coupled node tree were to grow large, only the necessary subtree need to be processed, and the handling of coupled node trees can be made easy.

Also it clear that the apparatus that executes the backup method or restore method of this invention, the memory means for storing a coupled node tree, and the processing shown in FIG. 10A to FIG. 10B or FIG. 13 can be constructed on a computer by programs that a computer is caused to execute.

Therefore, the programs, and a computer-readable storage medium into which the programs are stored are encompassed by a preferred embodiment of the present invention.

As was detailed in the above description, the coupled node tree backup method according to a preferred embodiment of this invention is a backup method that backup the nodes configuring the subtree of the coupled node tree that is the target of the backup, in a search sequence giving priority to the depth direction corresponding to the ascending or descending order of the index keys.

If either ascending order or descending order is selected, the search sequence giving priority to the depth direction is the sequence keeping a one-to-one correspondence with the tree structure of coupled node tree.

Also, a coupled node tree is characterized by the fact that, on one hand, it is arbitrary where each of the nodes is practically arranged in the storage area while, on the other hand, the tree structure is uniquely prescribed by the set of index keys.

Thus, in accordance with a preferred embodiment of this invention, the node information (backup information) is backed up in a standard sequence that does not depend on how the nodes are arranged in the storage area, that is, in a sequence that corresponds one to one with the tree structure that is uniquely prescribed by the set of index keys.

In other words, the node information (backup information) shows both a set of index keys by means of the restored leaf nodes and the tree structure of the coupled node tree by the sequentiality of the nodes.

Since this sequentiality exists, there is no need for any superfluous processing in the restore processing to determine the tree structure of the coupled node tree to be restored, and efficient restore is enabled.

From the above, the backup sequence in accordance with this invention can be said to be preferable sequence as an exchange format for node information.

What is claimed is:

1. A coupled node tree backup apparatus which backs up an arbitrary subtree of a coupled node tree being used in a bit string search comprising:

the coupled node tree having a root node as the starting point of the tree and node pairs which are configurational elements of the tree and which are two nodes, a primary node and a non-primary node, arranged in adjacent areas of storage, wherein the nodes have an area that holds the node type which indicates whether the node is a branch node or a leaf node, and the branch node having, in addition to the node type, an area that holds a discrimination bit position of a search key and an area holding information that indicates a position of a primary node of a node pair that is a link target but not having an area holding an index key composed of a bit string that is an object of searches, the leaf node having, in addition to the node type, an area holding the index key composed of a bit string that is the object of searches but not having an area that holds a discrimination bit position of the search key nor an area holding information that indicates the position of a primary node of a node pair that is a link target, and wherein at the branch node with an arbitrary node of the tree as a search start node, in response to a bit value of an index key at the discrimination bit position included in the branch node, by repeated linking to a primary node of a node pair of the link target or a node at a position in a memory area adjacent thereto until the leaf node is reached, an index key stored in the storage area pointed at by the second kind of position information included in the leaf node is made a search result key, which is a search result using a search key of an arbitrary subtree having the search start node as its root node;

a traverse start node specifying means specifying the root node of the subtree to be backed up as a traverse start node that is the starting point of the sequence in which the nodes are to be backed up;

a first node backup means making a traverse from the traverse start node specified by the traverse start node specifying means through linking to only the primary nodes or only the non-primary nodes until a leaf node is reached, and while successively storing in a stack the position information pointing to the position of each of those nodes on the path from the traverse start node until the leaf node, successively storing the contents of those nodes in a separate storage area from the storage area in which the coupled node tree is located;

a next traverse start node specifying means reading out the position information from the stack until the position information of the primary node or non-primary node is obtained, then specifying, as a next traverse start node, a non-primary node or primary node that is paired with the primary node or non-primary node whose storage information has been read out;

a second node backup means making a traverse from the next traverse start node specified by the next traverse start node specifying means through linking to only the primary nodes or only the non-primary nodes until a leaf node is reached, and while successively storing in the stack the position information pointing to the position of each of those nodes on the path from the traverse start node until the leaf node, successively storing the contents of those nodes in the separate storage area; and wherein the backup of the nodes by the second node backup means and the next traverse start node specification by the next traverse start node specifying means are repeated.

2. A coupled node tree restore apparatus which restores the coupled node tree from backup information of the contents of nodes backed up in the separate storage area by the coupled node tree backup apparatus according to claim 1, by restoring successively the nodes in the sequence backed up, the apparatus comprising:

a storage area for root node obtaining means obtaining a node storage area in which a root node of a coupled node tree to be restored is stored;

a node restoring means reading out successively the backup information and restoring a node through storing the contents of the node read out into the node storage area;

a node type determination means determining a node type of the node that is restored by the node restoring means;

a branch node restoring means, if the node type that has been determined by the node type determination means is one of a branch node, then obtaining a pair of node storage areas into which are stored respectively a child node backed up next to the branch node and a node paired with the child node, and writing a position information of the node storage area in which a primary node of a node pair including the child node is stored into a coupled node indicator of the branch node; and a node storage area search means, if the node type that has been determined by the node type determination means is one of a leaf node, then searching for a node storage area that has been obtained but contains no node contents by tracing back up the tree structure of the coupled node tree being restored toward the root node.

3. A coupled node tree backup method for backing up an arbitrary subtree of a coupled node tree being used in a bit string search comprising:

the coupled node tree having a root node as the starting point of the tree and node pairs which are configurational elements of the tree and which are two nodes, a primary node and a non-primary node, arranged in adjacent areas of storage, wherein the nodes have an area that holds the node type which indicates whether the node is a branch node or a leaf node, and the branch node having, in addition to the node type, an area that holds a discrimination bit position of a search key and an area holding information that indicates a position of a primary node of a node pair that is a link target but not having an area holding an index key composed of a bit string that is an object of searches, the leaf node having, in addition to the node type, an area holding the index key composed of a bit string that is the object of searches but not having an area that holds a discrimination bit position of the search key nor an area holding information that indicates the position of a primary node of a node pair that is a link target; and wherein at the branch node with an arbitrary node of the tree as a search start node, in response to a bit value of an index key at the discrimination bit position included in the branch node, by repeated linking to a primary node of a node pair of the link target or a node at a position in a memory area adjacent thereto until the leaf node is reached, an index key stored in the storage area pointed at by the second kind of position information included in the leaf node is made a search result key, which is a search result using a search key of an arbitrary subtree having the search start node as its root node;

a traverse start node specifying step specifying the root node of the subtree to be backed up as a traverse start node that is the starting point of the sequence in which the nodes are to be backed up;

a first node backup step making a traverse from the traverse start node specified by the traverse start node specifying step through linking to only the primary nodes or only the non-primary nodes until a leaf node is reached, and while successively storing in a stack the position information pointing to the position of each of those nodes on the path from the traverse start node until the leaf node, successively storing contents of those nodes in a separate storage area from the storage area in which the coupled node tree is located;

a next traverse start node specifying step reading out the position information from the stack until the position information of the primary node or non-primary node is obtained, then specifying, as a next traverse start node, a non-primary node or primary node that is paired with the primary node or non-primary node whose storage information has been read out;

a second node backup step making a traverse from the next traverse start node specified by the next traverse start node specifying step through linking to only the primary nodes or only the non-primary nodes until a leaf node is reached, and while successively storing in the stack the position information pointing to the position of each of those nodes on the path from the traverse start node until the leaf node, successively storing the contents of those nodes in the separate storage area; and wherein the backup of the nodes by the second node backup step and the next traverse start node specification by the next traverse start node specifying step are repeated.

4. A coupled node tree backup method according to claim 3, wherein the coupled node tree is stored in an array, and the position information of a node is an array element number of an array element in the array wherein the node is stored.

5. A coupled node tree backup method according to claim 3, wherein when a branch node is backed up, the discrimination bit position is included in the contents that are backed up to the separate storage area and when a leaf node is backed up, the index key is included in the backup contents.

6. A coupled node tree backup method according to claim 3, wherein the separate storage area is an array.

7. A coupled node tree backup method according to claim 3, wherein by the node backup step, the contents of those nodes are successively transferred to an external device via a transfer medium, instead of being stored in the separate storage area.

8. A coupled node tree restore method for restoring the coupled node tree from the backup information that is transferred to the external device by the coupled node tree backup method according to claim 7, by restoring successively the nodes in the sequence they are transferred, the method comprising:

a storage area for root node obtaining step obtaining a node storage area in which a root node of a coupled node tree to be restored is stored;

a node restoring step receiving successively the backup information and restoring a node through storing the contents of the node read out into a node storage area;

a node type determination step determining a node type of the node that is restored by the node restoring step;

a branch node restoring step, if the node type that has been determined by the node type determination step is one of a branch node, then obtaining a pair of node storage areas into which are stored respectively a child node backed up next to the branch node and a node paired with the child node, and writing a position information of the node storage area in which a primary node of a node pair including the child node is stored into a coupled node indicator of the branch node; and a node storage area search step, if the node type that has been determined by the node type determination step is one of a leaf node, then searching for a node storage area that has been obtained but contains no node contents by tracing back the tree structure of the coupled node tree being restored toward the root node.

9. A program that a computer is caused to execute, for performing the coupled node tree backup method according to claim 7.

10. A computer readable medium for storing a program that a computer is caused to execute, for performing the coupled node tree backup method according to claim 7.

11. A coupled node tree restore method for restoring the coupled node tree from backup information of the contents of nodes backed up in the separate storage area by the coupled node tree backup method according to claim 3, by restoring successively the nodes in the sequence they were backed up, the method comprising:

a storage area for root node obtaining step obtaining a node storage area in which a root node of a coupled node tree to be restored is stored;

a node restoring step reading out successively the backup information and restoring a node through storing the contents of the node read out into the node storage area;

a node type determination step determining a node type of the node that is restored by the node restoring step;

a branch node restoring step, if the node type that has been determined by the node type determination step is one of a branch node, then obtaining a pair of node storage areas into which are stored respectively a child node backed up next to the branch node and a node paired with the child node, and writing a position information of the node storage area in which a primary node of a node pair including the child node is stored into a coupled node indicator of the branch node; and a node storage area search step, if the node type that has been determined by the node type determination step is one of a leaf node, then searching for a node storage area that has been obtained but contains no node contents by tracing back up the tree structure of the coupled node tree being restored toward the root node.

12. A coupled node tree restore method according to claim 11, wherein
the coupled node tree is restored into an array, and the position information written into the branch node that is restored is the array element number of the array element which holds the primary node corresponding to the position information.

13. A coupled node tree restore method according to claim 11, wherein
in the backup information for the contents of the branch node, the discrimination bit position is included but the position information is not included, and for the contents of the leaf node, the index key is included.

14. A coupled node tree restore method according to claim 11, wherein
the coupled node tree to be restored is corresponding to a subtree of an original coupled node tree backed up in the backup information, and
the node restoring step skipping node contents backed up in backup information that are sequentially prior to the root node of the subtree and successively reading out the backup information starting from the root node of the subtree, and
in the node storage area search step, if the root node of the subtree being restored is encountered, restore processing being terminated.

15. A coupled node tree restore method according to claim 11, wherein the backup information is stored in an array.

16. A program that a computer is caused to execute, for performing the coupled node tree restore method according to claim 11.

17. A computer readable medium for storing a program that a computer is caused to execute, for performing the coupled node tree restore method according to claim 11.

18. A program that a computer is caused to execute, for performing the coupled node tree backup method according to claim 3.

19. A computer readable medium for storing a program that a computer is caused to execute, for performing the coupled node tree backup method according to claim 3.

* * * * *